(12) United States Patent
Kuppelur et al.

(10) Patent No.: US 12,324,055 B2
(45) Date of Patent: Jun. 3, 2025

(54) STEERING OF ROAMING CHECK DURING MOBILITY REGISTRATION

(71) Applicant: APPLE INC., Cupertino, CA (US)

(72) Inventors: Nitin Kuppelur, Bengaluru (IN); Krisztian Kiss, Cupertino, CA (US); Deepak Dash, Bengaluru (IN); Karthik Anantharaman, Cupertino, CA (US); Kavya B. Ravikumar, San Diego, CA (US); Nirlesh Koshta, Bengaluru (IN); Sridhar Prakasam, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 682 days.

(21) Appl. No.: 17/593,646

(22) PCT Filed: Jun. 24, 2021

(86) PCT No.: PCT/US2021/038824
§ 371 (c)(1),
(2) Date: Sep. 22, 2021

(87) PCT Pub. No.: WO2022/035512
PCT Pub. Date: Feb. 17, 2022

(65) Prior Publication Data
US 2022/0312360 A1 Sep. 29, 2022

(30) Foreign Application Priority Data
Aug. 12, 2020 (IN) .............................. 202041034618

(51) Int. Cl.
*H04W 8/12* (2009.01)
*H04W 48/18* (2009.01)
(Continued)

(52) U.S. Cl.
CPC ............. *H04W 8/12* (2013.01); *H04W 48/18* (2013.01); *H04W 60/04* (2013.01); *H04W 84/042* (2013.01)

(58) Field of Classification Search
CPC ....................................................... H04W 8/12
See application file for complete search history.

(56) References Cited

U.S. PATENT DOCUMENTS

2019/0182655 A1 6/2019 Gupta et al.
2019/0268752 A1 8/2019 Buckley et al.
(Continued)

FOREIGN PATENT DOCUMENTS

EP 3820199 A1 5/2021
WO 2020096346 A1 5/2020

OTHER PUBLICATIONS

NTT DOCOCMO, "Discussion paper on SOR during initial registration", C1-196180, 3GPP TSG CT WG1 Meeting #120, Portoroz, Slovenia, Release Rel-15. Agenda Item x.x, Oct. 7-11, 2019, 4 pages.

(Continued)

*Primary Examiner* — Jason E Mattis
(74) *Attorney, Agent, or Firm* — Dorsey & Whitney LLP

(57) ABSTRACT

Systems and methods provide steering of roaming (SoR) information during a user equipment (UE) mobility registration process. In other systems and methods, instead of triggering mobility and periodic registration, a UE performs initial registration until a valid SoR is received in a visited country or network as long as a subscriber identification module (SIM) or a universal SIM (USIM) of the UE indicates that the UE is expected to receive SoR information due to initial registration in a visited public land mobile network (VPLMN).

14 Claims, 11 Drawing Sheets

(51) Int. Cl.
*H04W 60/04* (2009.01)
*H04W 84/04* (2009.01)

(56) References Cited

U.S. PATENT DOCUMENTS

| | | |
|---|---|---|
| 2019/0313238 A1 | 10/2019 | Palanigounder et al. |
| 2020/0145299 A1 | 5/2020 | Do et al. |
| 2020/0221281 A1 | 7/2020 | Rajadurai et al. |
| 2021/0051466 A1* | 2/2021 | Kumar .................. H04W 76/27 |
| 2021/0250890 A1* | 8/2021 | Won ...................... H04W 48/16 |
| 2022/0394456 A1* | 12/2022 | Liu ....................... H04W 48/18 |
| 2022/0394652 A1* | 12/2022 | Thakolsri .............. H04W 60/00 |
| 2023/0188574 A1* | 6/2023 | Keller ................. H04L 65/1069 |
| | | 370/352 |

OTHER PUBLICATIONS

3GPP TS 23.122, "3rd Generation Partnership Project; Technical Specification Group Core Network and Terminals; Non-Access-Stratum (NAS) functions related to Mobile Station (MS) in idle mode (Release 16)", V16.6.1, Jul. 2020, 81 pages.

3GPP TS 29.550, "3rd Generation Partnership Project; Technical Specification Group Core Network and Terminals; 5G System; Steering of roaming application function services; Stage 3 (Release 16)", V16.1.0, Jul. 2020, 21 pages.

LG Electronics, "mobility registration type for 5G steering of roaming over control plane", C1-203597, 3GPP TSG-CT WG1 Meeting #124-e, Change Request 23.122 CR 0555, Current Version 16.5.0, Electronic meeting, Jun. 2-10, 2020, 8 pages.

LG Electronics , "mobility registration type for 5G steering of roaming over control plane", C1-203597, 3GPP TSG-CT WG1 Meeting #124-e, Electronic Meeting, Change Request 23.122 CR 0555 rev 1 Current Version 16.5.0, Jun. 2-10, 2020, 7 pages.

PCT/US2021/038824 , International Search Report and Written Opinion, Dec. 13, 2021, 21 pages.

U.S. Appl. No. 18/473,489, Non-Final Office Action, Aug. 13, 2024, 9 pages.

* cited by examiner

STEERING OF ROAMING CHECK DURING MOBILITY REGISTRATION

TECHNICAL FIELD

This application relates generally to wireless communication systems, including steering of roaming (SoR) in public land mobile networks (PLMNs).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Steering of UE in a visited public land mobile network (VPLMN) is a procedure enabling a home public land mobile network (HPLMN) to update a list of preferred PLMN/access technology combinations at the UE via non-access stratum (NAS) signaling. An HPLMN is a PLMN where a mobile country code (MCC) and a mobile network code (MNC) of the PLMN identity match the MCC and MNC of the international mobile subscriber identity (IMSI) of the UE. Matching criteria may be defined by a 3GPP standard. The VPLMN is a PLMN different from the HPLMN (if an equivalent HPLMN (EHPLMN) list is not present or is empty) or different from an EHPLMN (if the EHPLMN list is present). The HPLMN updates the list of preferred PLMN/access technology combinations, for example, depending on the PLMN where the UE is registered or when required by HPLMN operator policies. Steering of UE in VPLMN may also be known as steering of roaming (SoR). SoR enables a HPLMN to steer a UE from one network to another. SoR is a technique whereby a roaming UE is encouraged to roam to a preferred roamed-to-network by the HPLMN.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
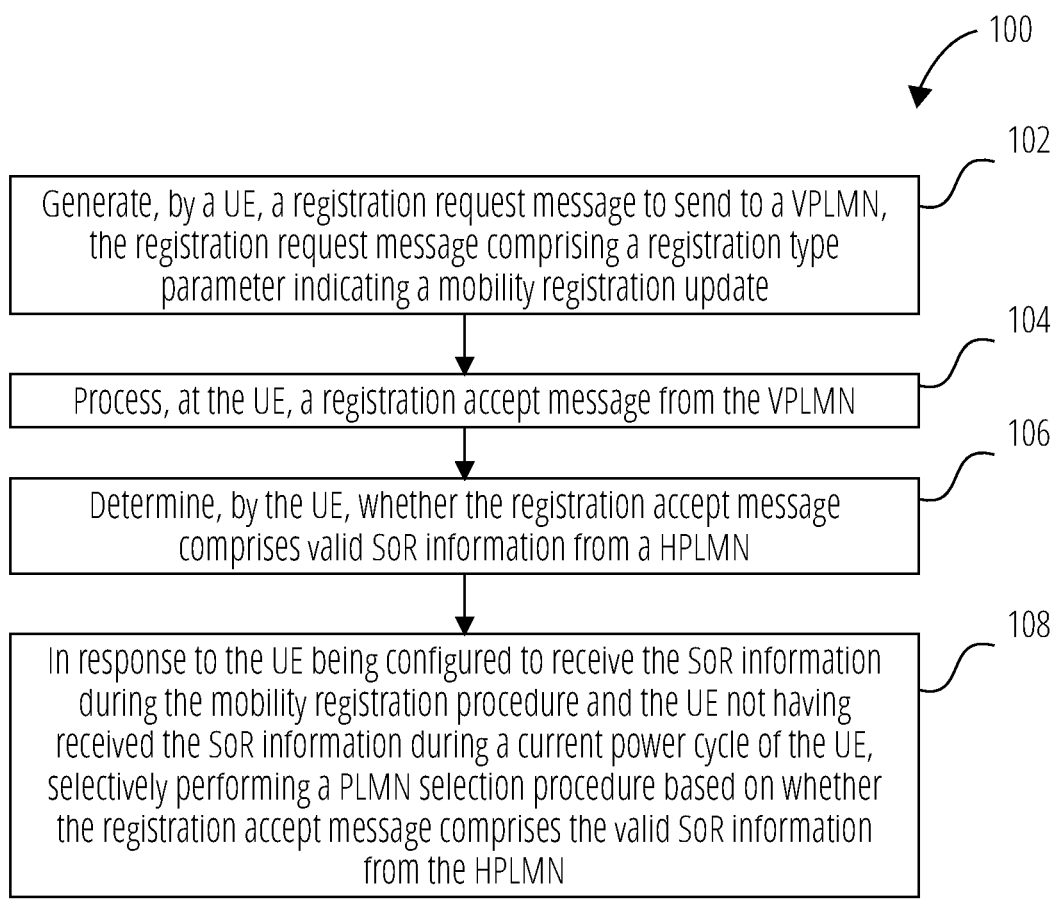
FIG. 1 illustrates a flowchart for a method for a UE to communicate in a PLMN in accordance with one embodiment.

Both a subscriber and the subscriber's regular mobile operator (i.e., the UE's home network) may prefer that roaming be done via local operators with acceptable pricing and network quality. As discussed above, SoR allows a home network to redirect a UE to connect via a preferred roaming partner in a given location. Embodiments disclosed herein are generally directed to facilitating SoR within a 5G NR access network during a UE mobility registration process. In other embodiments, instead of triggering mobility and periodic registration, a UE performs initial registration until a valid SoR is received in a visited country or network as long as a subscriber identification module (SIM) or a universal SIM (USIM) of the UE indicates that the UE is expected to receive SoR information due to initial registration in a VPLMN.

Registration with a PLMN includes the process of camping on a cell of the PLMN or stand-alone non-public network (SNPN) and doing any necessary location registrations (LRs). The SoR information comprises HPLMN protected information including an indication of whether a unified data management (UDM) requests an acknowledgement from the UE for successful reception of the steering of roaming information. The SoR information also includes one of the following: a list of preferred PLMN/access technology combinations with an indication that it is included; a secured packet with an indication that it is included; or an HPLMN indication that no change of an "Operator Controlled PLMN Selector with Access Technology" list stored in the UE is needed and thus no list of preferred PLMN/access technology combinations is provided. The secured packet comprises the list of preferred PLMN/access technology combinations encapsulated with a security mechanism (see, e.g., 3GPP TS 31.115).

Certain aspects disclosed herein are directed to a 5G SoR methodology that is effective even when a visited (i.e., roaming) network cannot be trusted to relay steering information received from a UE's home network. Generally, an SoR methodology includes a home network transmitting SoR information to a UE via the visited (i.e., roaming) network as part of the UE registration, wherein the UE is configured by the HPLMN to determine whether to initiate steering of roaming procedures at the UE as part of the registration process based on whether the SoR information is actually received. If the HPLMN does not configure the UE, then the UE skips performing SoR procedures. If the UE is configured to perform steering of roaming and the SoR information is not received (or an integrity check of the SoR indicator fails), for example, the UE may be configured to set the currently visited (i.e., roaming) network at a lowest priority level so that the UE knows it should attempt to connect to an alternative roaming network, if possible. If the SoR information is received (and the SoR information passes an integrity check), however, the UE may then be configured to steer roaming according to the steering information from the home network. The integrity check may be at least partially based on one or more keys shared between the HPLMN and the UE. If the home network concludes that the currently visited (i.e., roaming) network is acceptable, the home network may convey that conclusion by sending an SoR indicator to the UE without additional steering information. However, if the home network concludes that the currently visited (i.e., roaming) network is not acceptable, such conclusion may be communicated by sending an SoR indicator to the UE with additional steering information. The UE may then update the PLMN/RAT network selection information in its SIM or USIM or in its internal memory to steer roaming according to the steering information received from the home network.

In certain system implementations (e.g., see 3GPP TS 23.122), the HPLMN can configure the USIM to indicate that the UE is expected to receive SoR information due to an initial registration in a VPLMN so that the UE is able to detect whether the VPLMN altered the SoR information. If the UE detects that the VPLMN altered or removed the SoR information, then the UE may consider the current VPLMN as the lowest priority PLMN. Currently, however, an SoR update is only specified for initial and emergency registration. For example, UE context information stored in an access and mobility management function (AMF) only includes an SoR update indicator for initial registration and emergency registration. The SoR update indicator for initial registration indicates whether the UDM requests the AMF to retrieve SoR information when the UE performs registration with a non-access stratum (NAS) registration type "Initial Registration." The SoR update indicator for emergency registration indicates whether the UDM requests the AMF to retrieve SoR information when the UE performs registration with NAS registration type "Emergency Registration."

In scenarios where a UE performs registration on 5G due to mobility from another RAT or for a PLMN change, in prior systems, the SoR check during the mobility registration is not mandatory even when UE USIM indicates that the UE is expected to receive the steering of roaming information. Thus, the AMF and the UE will not perform SoR related actions. This may result in UE remaining on an unacceptable low priority VPLMN (e.g., which has altered or removed the SoR information received from HPLMN). A few non-limiting example scenarios of this problem are described below, but the issue can be seen in general in flows where the mobility registration is triggered on 5G roaming PLMN, without previously receiving the SoR container from the HPLMN.

In one example scenario, a UE's USIM indicates that the UE is expected to receive SoR information due to initial registration in a VPLMN. The UE camps and registers on VPLMN1 on LTE. Then, the UE reselects in the same VPLMN1 on 5G (different RAT) and performs mobility registration on 5G. An SoR transparent container information element (IE) is not included in the registration accept message in 5G VPLMN1. As the USIM is configured with the indication that the UE is to receive and check the integrity of the SOR transparent container IE only for the initial registration accept message, the UE remains on VPLMN1.

In another example scenario, a UE's USIM indicates that the UE is expected to receive the SoR information due to initial registration in a VPLMN. The UE camps and registers on 5G VPLMN1 successfully (AUTHENTICATION/SMC) but did not receive the SoR container. The UE moves to REGISTERED-NORMAL-SERVICE. As per 3GPP TS 24.501, section 5.5.1.2.4, the UE locally releases the connection, de-prioritizes VPLMN1, and selects VPLMN2. The UE performs mobility registration on VPLMN2 but VPLMN2 does not provide an SoR container. As the USIM is configured with the indication that the UE is to receive and check the integrity of the SOR transparent container IE only for the initial registration accept message, the UE remains on VPLMN2.

A control plane solution for SoR in 5GS is specified in 3GPP TS 23.122. When a UE camps in a roaming network, the HPLMN may steer the UE to a most preferred network by sending SoR container as part of Initial Registration or a downlink (DL) NAS transport message. There are scenarios where the UE is unable to successfully receive and store the SoR container, which results in adding the current VPLMN to a "PLMNs where registration was aborted due to SOR" list. Problems may arise when the UE maintains this list that could prevent the UE from getting normal service or being stuck in a low priority PLMN. For example, when two VPLMNs are deployed/available in a current country, a UE registers on VPLMN1 and a registration accept message is received. The UE may have an operator controlled PLMN (OPLMN) list in SIM. Conditions to add the current PLMN to the "PLMNs where registration was aborted due to SOR" list are met, so VPLMN1 is now added to the list and the connection is released. The UE attempts a high priority PLMN search and finds VPLMN2 that may be a low priority PLMN. Registration is attempted on the VPLMN2 and a registration accept message is received. After registration complete, the UE stays in VPLMN2 and adds VPLMN2 to the "PLMNs where registration was aborted due to SOR" list. The UE then attempts high priority PLMN scan. Periodic HPLMN scan continues. If the UE initiates mobility registration, then it no longer expects SoR to be received from the HPLMN, making the UE to get stuck at a non-preferred PLMN and not attempt any more PLMN selection until HPLMN timer expires.

In one embodiment, the UE context information stored in an AMF (defined in 3GPP TS 23.502, Table 5.2.2.2.2-1 and discussed in detail below) is extended to maintain an indicator "SoR Update Indicator for Mobility Registration" to indicate that if no SoR container is shared with the UE in previous registration attempts, the UDM should request the AMF to receive the SoR container on a mobility registration request. In certain such embodiments, this indicator can be reset once the SoR container is successfully shared with UE to avoid signaling overload between the UE, AMF, and/or UDM on every mobility registration.

For example, Table 1 shows a definition for an SoR Update Indicator for Mobility Registration included in UE context information stored in an AMF, along with the SoR Update Indicator for Initial Registration and the SoR Update for Emergency Registration, used for a registration procedure according to certain embodiments.

TABLE 1

| | |
|---|---|
| SoR Update Indicator for Initial Registration | An indication whether the UDM requests the AMF to retrieve SoR information when the UE performs Registration with NAS Registration Type "Initial Registration" |
| SoR Update Indicator for Emergency Registration | An indication whether the UDM requests the AMF to retrieve SoR information when the UE performs Registration with NAS Registration Type "Emergency Registration" |
| SoR Update Indicator for Mobility Registration | An indication whether the UDM requests the AMF to retrieve SoR information when the UE performs Mobility Registration with NAS Registration Type "Mobility Registration", when SoR container not delivered to UE in previous registrations |

In certain embodiments, an HPLMN can configure their subscribed UE's SIM or USIM to indicate that the UE is expected to receive the steering of roaming information due to initial registration or mobility registration triggered before successfully receiving the SOR container in a current power cycle registration in a VPLMN. At the same time the HPLMN may mark that the UE is expected to receive the steering of roaming information due to initial registration or mobility registration triggered before successfully receiving the SOR container in a current power cycle in a VPLMN, in the subscription information in the UDM. In this case, the HPLMN will provide the steering of roaming information to the UE during initial registration or mobility registration triggered before successfully receiving the SOR container in the current power cycle in the VPLMN. Otherwise, if such configuration is not provided in the SIM or USIM, it is optional for the HPLMN to provide the steering of roaming information to the UE during initial registration or mobility registration triggered before successfully receiving the SOR container in the current power cycle (e.g., based on operator policy).

In certain embodiments for steering of UE in VPLMN during registration, as described in further detail below, a 5GS registration type IE in a received registration request message indicates "initial registration" or "mobility registration updating" and the "SoR Update Indicator for Initial Registration" field in the UE context is set to indicate that the UDM requests the AMF to retrieve SoR information when the UE performs NAS registration type "initial registration" or "mobility registration updating" (e.g., as specified in Table 5.2.2.2.2-1 of 3GPP TS 23.502).

In addition, or in other embodiments, if the user subscription information indicates to send the steering of roaming information due to initial registration or mobility registration triggered before successfully receiving the SOR container in a current power cycle in a VPLMN, then the HPLMN UDM provides the steering of roaming information to the UE when the UE performs initial registration or mobility registration triggered before successfully receiving the SOR container in current power cycle in a VPLMN. Otherwise, the HPLMN UDM may provide the steering of roaming information to the UE, based on operator policy.

In certain embodiments, in a mobility and periodic registration update accepted by the network (e.g., see 3GPP TS 24.501, section 5.5.1.3.4), if: (a) the UE's USIM is configured with an indication that the UE is to receive the SOR transparent container IE and UE has not received SOR container in the current power cycle, and if the SOR transparent container IE is not included in the REGISTRATION ACCEPT message or the SOR transparent container IE does not successfully pass the integrity check (see 3GPP TS 33.501); and (b) if the UE attempts obtaining service on another PLMNs as specified in 3GPP TS 23.122, annex C; then the UE locally releases the established N1 NAS signaling connection after sending a REGISTRATION COMPLETE message.

In addition, or in other embodiments of the mobility and periodic registration update accepted by the network (e.g., see 3GPP TS 24.501, section 5.5.1.3.4), if the REGISTRATION ACCEPT message includes the SOR transparent container IE and the SOR transparent container IE successfully passes the integrity check (see 3GPP TS 33.501): (a) the UE proceeds with the behavior as specified in 3GPP TS 23.122, annex C; and (b) if the registration procedure is performed over 3GPP access and the UE attempts obtaining service on other PLMNs as specified in 3GPP TS 23.122, annex C, then the UE may locally release the established N1 NAS signaling connection after sending a REGISTRATION COMPLETE message. Otherwise, the UE sends a REGISTRATION COMPLETE message and does not release the current N1 NAS signaling connection locally. If an acknowledgement is requested in the SOR transparent container IE of the REGISTRATION ACCEPT message, the UE acknowledgement is included in the SOR transparent container IE of the REGISTRATION COMPLETE message.

In addition, or in other embodiments of the mobility and periodic registration update accepted by the network (e.g., see 3GPP TS 24.501, section 5.5.1.3.4), if the SOR transparent container IE successfully passes the integrity check (see 3GPP TS 33.501) and indicates that a list of preferred PLMN/access technology combinations is provided and the list type indicates: (a) "PLMN ID and access technology list", then the UE replaces the highest priority entries in the "Operator Controlled PLMN Selector with Access Technology" list stored in the UE and proceeds with the behavior as specified in 3GPP TS 23.122, annex C; or (b) "secured packet", then the UE behaves as if a short message service (SMS) is received with a protocol identifier set to SIM data download, data coding scheme set to class 2 message, and SMS payload as secured packet contents of SOR transparent container IE. The SMS payload is forwarded to a universal integrated circuit card (UICC) as specified in 3GPP TS 23.040 and the UE proceeds with the behavior as specified in 3GPP TS 23.122, annex C.

In certain embodiments, instead of triggering mobility and periodic registration, the UE performs initial registration until a valid SoR is received in a visited country as long as the USIM indicates that the UE is expected to receive the steering of roaming information due to initial registration in a VPLMN. In certain such embodiments, an initial registration initiation procedure (e.g., see 3GPP TS 24.501, section 5.5.1.2.2) is modified to specify that a UE in state SGMM-DEREGISTERED initiates the registration procedure for initial registration by sending a REGISTRATION REQUEST message to the AMF: (a) when the UE performs initial registration for 5GS services; (b) when the UE performs initial registration for emergency services; (c)

when the UE performs initial registration for SMS over NAS; (d) when the UE moves from GERAN to NG-RAN coverage or the UE moves from a UTRAN to NG-RAN coverage and the UE initiated a GPRS attach or routing area updating procedure while in A/Gb mode or Iu mode, and since then the UE did not perform a successful EPS attach or tracking area updating procedure in S1 mode or registration procedure in N1 mode; and (e) when the UE has not successfully received SoR container yet in VPLMN and the UE's USIM is configured to indicate that the UE expects to receive the steering of roaming information during an initial registration procedure.

Thus, according to one or more of the embodiments disclosed herein the UE is able to detect whether the VPLMN has altered or removed the SoR information and consider the such VPLMN as the lowest priority PLMN. Further, as the UE will avoid remaining on low priority PLMNs and will select a high priority PLMN indicated by HPLMN in SoR container, the disclosed embodiments will benefit both Operator and Users. Thus, the disclosed embodiments help block fraud networks from manipulating the SoR container checks by triggering first camping on LTE and then redirecting the UE to 5G network in which case the SoR checks will be avoided.

FIG. 1 is a flowchart for a method 100 for a UE to communicate in a PLMN according to one embodiment. In block 102, the method 100 includes generating, by the UE, a registration request message to send to a VPLMN, the registration request message comprising a registration type parameter indicating a mobility registration update. In block 104, the method 100 includes processing, at the UE, a registration accept message from the VPLMN. In block 106, the method 100 includes determining, by the UE, whether the registration accept message comprises valid SoR information from an HPLMN. In block 108, in response to the UE being configured to receive the SoR information during the mobility registration procedure and the UE not having received the SoR information during a current power cycle of the UE, the method 100 includes selectively performing a PLMN selection procedure based on whether the registration accept message comprises the valid SoR information from the HPLMN.

In certain embodiments of the method 100, a subscriber identification module (SIM) or a universal SIM (USIM) of the UE is configured with an indication that the UE is to receive a SoR transparent container in the registration accept message, the SoR transparent container comprising the SoR information. Determining whether the registration accept message comprises the secure copy of the SoR information from the HPLMN may include determining whether the SoR transparent container successfully passes an integrity check.

In certain embodiments of the method 100, the SoR information further comprises a prioritized list of preferred PLMNs or preferred PLMN and access technology combinations, and selectively performing the PLMN selection procedure based on whether the registration accept message comprises the secure copy of the SoR information from the HPLMN comprises: determining that the registration accept message does not include the SoR information or that the SoR information has been altered by the VPLMN; setting the VPLMN as a lowest priority PLMN in a local list stored in the UE; locally releasing a non-access stratum (NAS) signaling connection after sending a registration complete message to the VPLMN; and performing the PLMN selection procedure based on the local list to attempt registration with a different PLMN.

In certain embodiments of the method 100, the SoR information further comprises a prioritized list of preferred PLMNs or preferred PLMN and access technology combinations, and selectively performing the PLMN selection procedure based on whether the registration accept message comprises the secure copy of the SoR information from the HPLMN comprises: determining that the registration accept message includes the SoR information and that the SoR information successfully passes an integrity check; and performing the PLMN selection procedure based on the prioritized list. In one such embodiments, the SoR information includes a list type indicator that indicates the prioritized list is a PLMN identifier (ID) and access technology list, and the method 100 further comprises replacing one or more highest priority entries in a local list stored in the UE with entries from the prioritized list. In another such embodiment, the SoR information includes a list type indicator that indicates the prioritized list comprises a secured packet received a short message service (SMS) message, and the method 100 further comprises: processing the SMS message as if it is received with a protocol identifier set to subscriber identification module (SIM) data download, data coding scheme set to class 2 message, and SMS payload as secured packet contents of an SoR transparent container information element (IE); and forwarding the SMS payload to a universal integrated circuit card (UICC).

Figure 2:
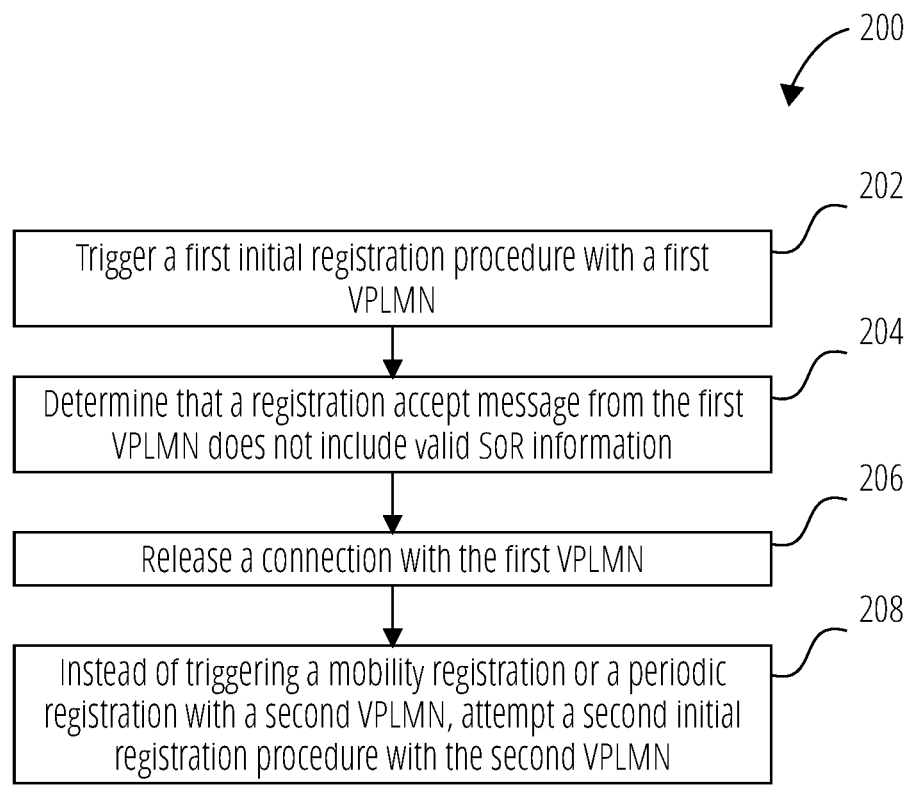
FIG. 2 illustrates a flowchart of a method for a UE in accordance with one embodiment.

FIG. 2 is a flowchart of a method 200 for a UE according to another embodiment. In block 202, the method 200 includes triggering a first initial registration procedure with a first VPLMN. In block 204, the method 200 includes determining that a registration accept message from the first VPLMN does not include valid SoR information. In block 206, the method 200 includes releasing a connection with the first VPLMN. In block 208, instead of triggering a mobility registration or a periodic registration with a second VPLMN, the method 200 includes attempting a second initial registration procedure with the second VPLMN.

Certain embodiments of the method 200 further include refraining from triggering the mobility registration or the periodic registration in the first VPLMN, the second VPLMN, or another VPLMN until the valid SoR information is received as long as a SIM or USIM of the UE is configured with an indication that the UE is expected to receive the valid SoR information due to initial registration in a VPLMN.

In certain embodiments of the method 200, the SoR information comprises a prioritized list of preferred PLMNs or preferred PLMN and access technology combinations.

Figure 3:
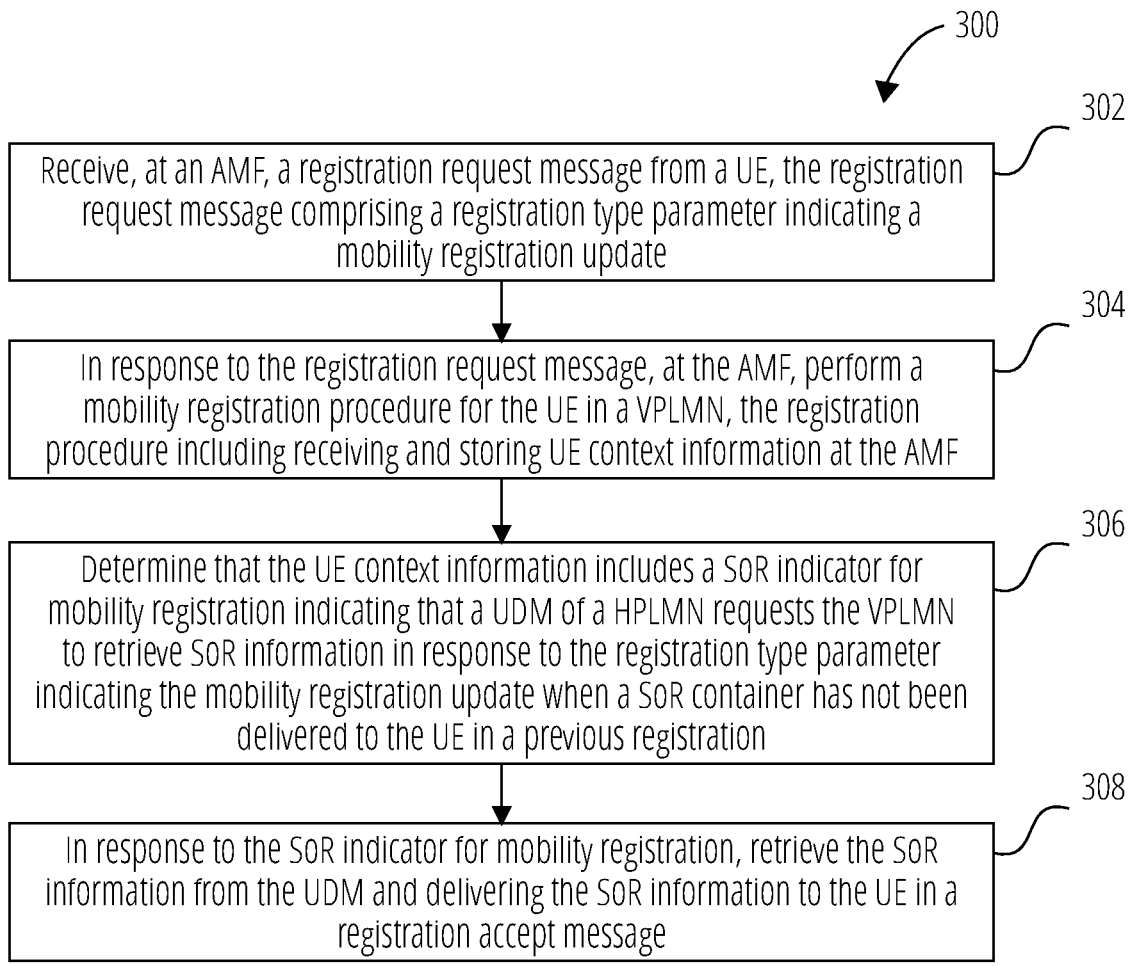
FIG. 3 illustrates a flowchart illustrating a method for an AMF in a wireless network in accordance with one embodiment.

FIG. 3 is a flowchart illustrating a method 300 for an AMF in a wireless network. In block 302, the method 300 includes receiving, at the AMF, a registration request message from a UE, the registration request message comprising a registration type parameter indicating a mobility registration update. In block 304, in response to the registration request message, the method 300 includes, at the AMF, performing a mobility registration procedure for the UE in a VPLMN, the registration procedure including receiving and storing UE context information at the AMF. In block 306, the method 300 includes determining that the UE context information includes a steering of roaming (SoR) indicator for mobility registration indicating that a UDM of an HPLMN requests the VPLMN to retrieve SoR information in response to the registration type parameter indicating the mobility registration update when a SoR container has not been delivered to the UE in a previous registration. In block 308, in response to the SoR indicator for mobility registration, the method 300 includes retrieving the SoR information from the UDM and delivering the SoR information to the UE in a registration accept message.

In certain embodiments of the method 300, retrieving the SoR information from the UDM comprises invoking a Nudm_SDM_Get service operation message to the UDM to retrieve the SoR information.

In certain embodiments of the method 300, delivering the SoR information to the UE comprises delivering the SoR container to the UE.

In certain embodiments of the method 300, the SoR information comprises a prioritized list of preferred PLMNs or preferred PLMN and access technology combinations. The SoR information may further include a list type indicator that indicates the prioritized list is one of a PLMN identifier (ID) and access technology list or a secured packet.

Figure 4:
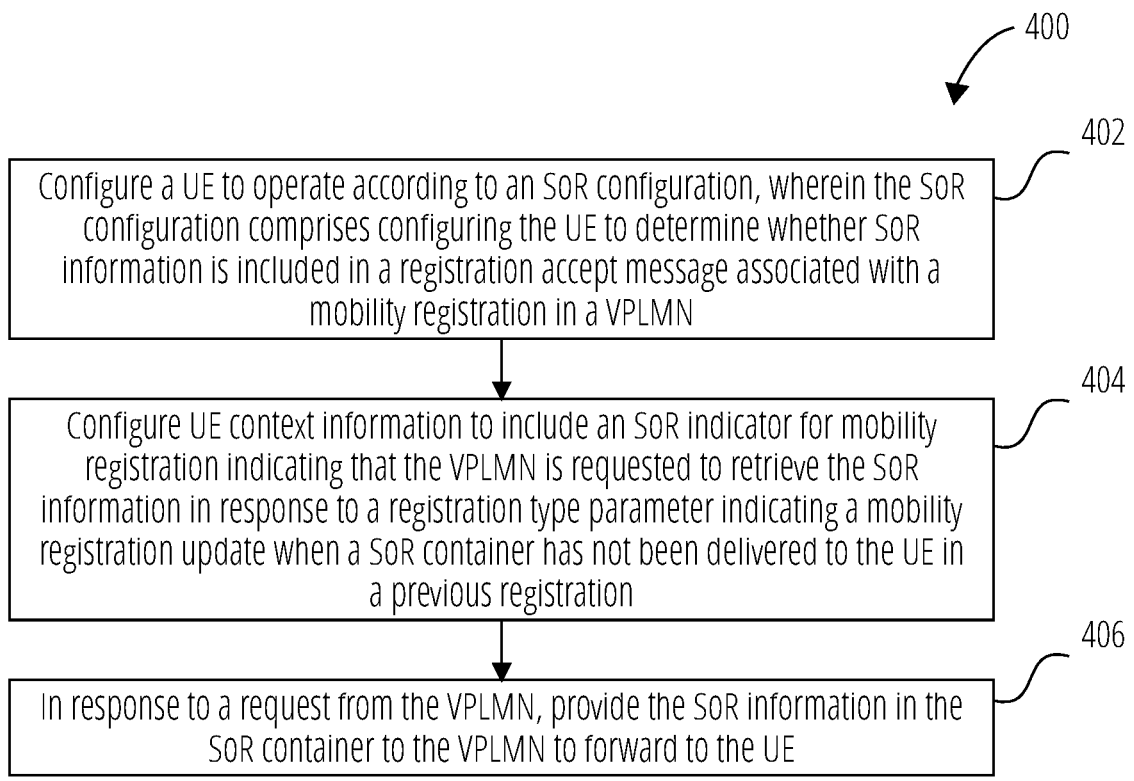
FIG. 4 illustrates a flowchart of a method for an HPLMN in accordance with one embodiment.

FIG. 4 is a flowchart of a method 400 for an HPLMN. In block 402, the method 400 includes configuring a UE to operate according to a SoR configuration, wherein the SoR configuration comprises configuring the UE to determine whether SoR information is included in a registration accept message associated with a mobility registration in a VPLMN. In block 404, the method 400 includes configuring UE context information to include an SoR indicator for mobility registration indicating that the VPLMN is requested to retrieve the SoR information in response to a registration type parameter indicating a mobility registration update when a SoR container has not been delivered to the UE in a previous registration. In block 406, in response to a request from the VPLMN, the method 400 includes providing the SoR information in the SoR container to the VPLMN to forward to the UE.

Certain embodiments of the method 400 further include securing the SoR container using a key shared with the UE.

In certain embodiments of the method 400, the SoR configuration further comprises configuring the UE to lower a priority of the VPLMN, if the UE determines that the SoR container is not in the registration accept message associated with a mobility registration in the VPLMN or that the SoR container failed an integrity check.

In certain embodiments of the method 400, the SoR information comprises a prioritized list of preferred PLMNs or preferred PLMN and access technology combinations.

In certain embodiments of the method 400, the SoR information further includes a list type indicator that indicates the prioritized list is one of a PLMN identifier (ID) and access technology list or a secured packet.

Figure 5A:
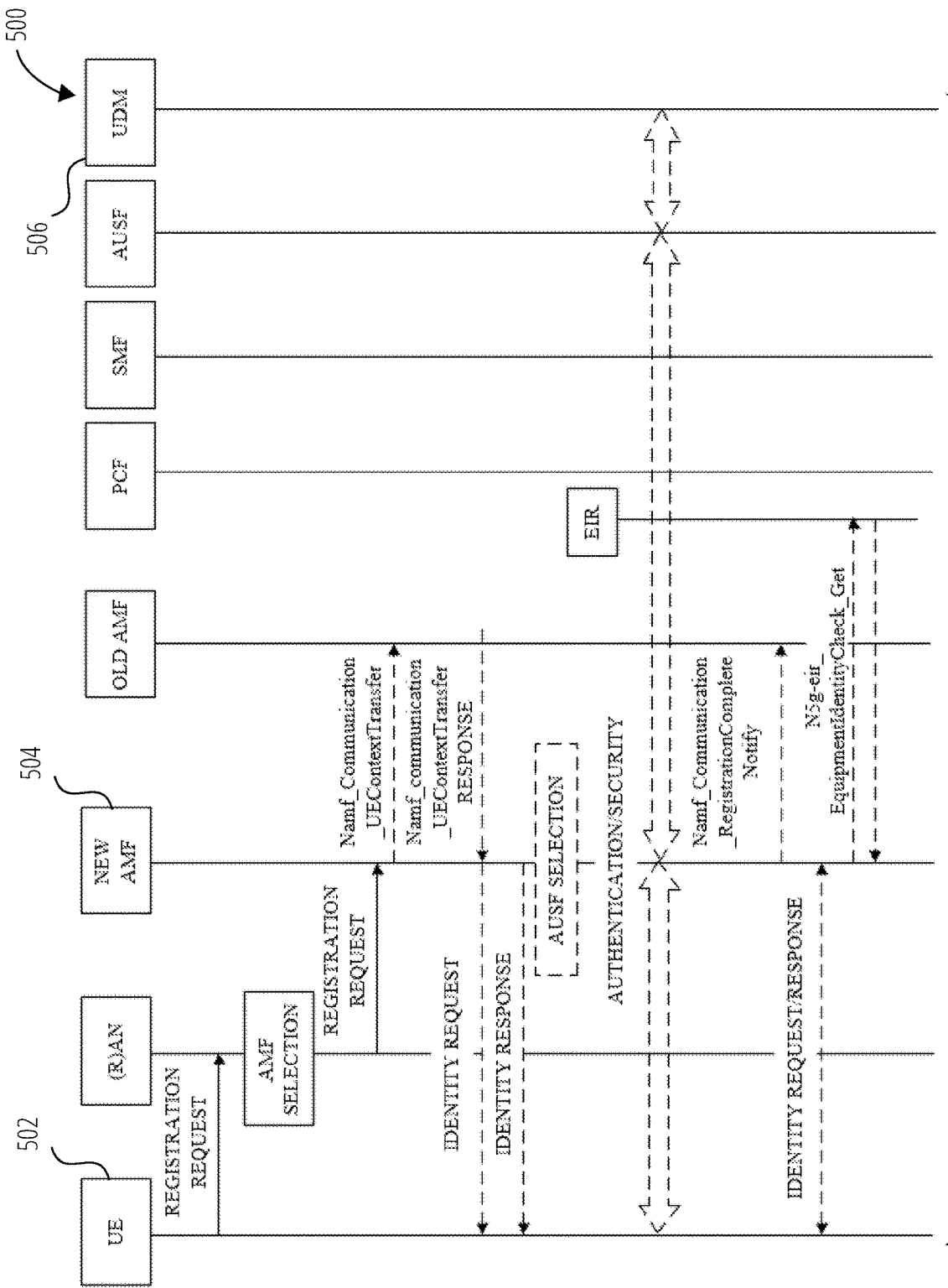
FIG. 5A and FIG. 5B illustrate a data flow diagram of an example registration procedure in accordance with one embodiment.
Figure 5B:
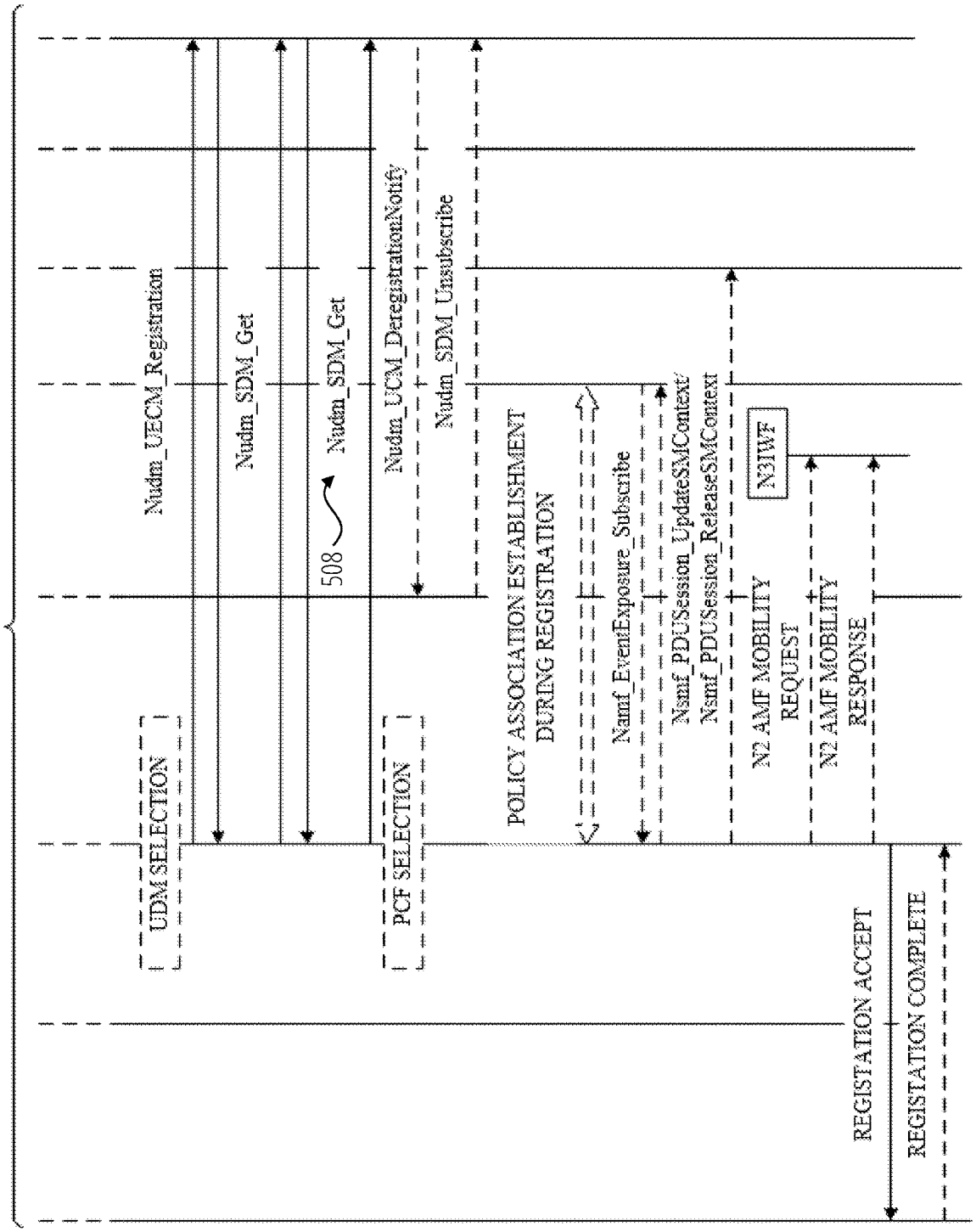

FIG. 5A and FIG. 5B illustrate a data flow diagram 500 of an example registration procedure according to one embodiment. The illustrated registration procedure is based on a registration call flow described in 3GPP TS 23.502 section 4.2.2.2.2, but which is modified based on certain embodiments disclosed herein. A UE 502 registers with a network to get authorized to receive services, to enable mobility tracking and to enable reachability. The UE 502 initiates the Registration procedure using one of the following Registration types: Initial Registration to the 5GS; Mobility Registration Update upon changing to a new Tracking Area (TA) outside the UE's Registration Area in both CM-CONNECTED and CM-IDLE state, or when the UE needs to update its capabilities or protocol parameters that are negotiated in Registration procedure with or without changing to a new TA, a change in the UE's Preferred Network Behavior that would create an incompatibility with the Supported Network Behavior provided by the serving AMF, or when the UE intends to retrieve LADN Information; or Periodic Registration Update (due to a predefined time period of inactivity); or Emergency Registration.

As discussed above, UE context information stored in an AMF 504 is extended to include an indicator "SoR Update Indicator for Mobility Registration" to indicate whether the UDM 506 requests the AMF 504 to retrieve SoR information when the UE 502 performs Mobility Registration with NAS Registration Type "Mobility Registration", when the SoR container not delivered to UE in previous registrations.

At steps 508 in FIG. 5B, if the AMF 504 (or the Old AMF) does not have subscription data for the UE 502, the AMF 504 retrieves the Access and Mobility Subscription data, SMF Selection Subscription data, UE context in SMF data and LCS mobile origination using Nudm SDM Get. If the AMF 504 already has subscription data for the UE but the SoR Update Indicator in the UE context requires the AMF to retrieve SoR information depending on the NAS Registration Type ("Initial Registration" or "Emergency Registration" or "Mobility Registration") (see Annex C of TS 23.122), the AMF 504 retrieves the Steering of Roaming information using Nudm_SDM_Get. The UDM 506 may retrieve this information from UDR by Nudr_DM_Query. After a successful response is received, the AMF 504 subscribes to be notified using Nudm SDM Subscribe when the data requested is modified, the UDM 506 may subscribe to UDR by Nudr_DM_Subscribe. The GPSI is provided to the AMF 504 in the Access and Mobility Subscription data from the UDM 506 if the GPSI is available in the UE subscription data. The UDM 506 may provide indication that the subscription data for network slicing is updated for the UE 502. If the UE 502 is subscribed to MPS in the serving PLMN, "MPS priority" is included in the Access and Mobility Subscription data provided to the AMF 504. If the UE 502 is subscribed to MCX in the serving PLMN, "MCX priority" is included in the Access and Mobility Subscription data provided to the AMF 504. The UDM 506 also provides the IAB-Operation allowed indication to AMF 504 as part of the Access and Mobility Subscription data. The AMF 504 triggers the setup of the UE context in NG-RAN, or modification of the UE context in NG-RAN if the initial setup is at step 9c described in 3GPP TS 23.502 section 4.2.2.2.2, including an indication that the IAB node is authorized.

Figure 6:
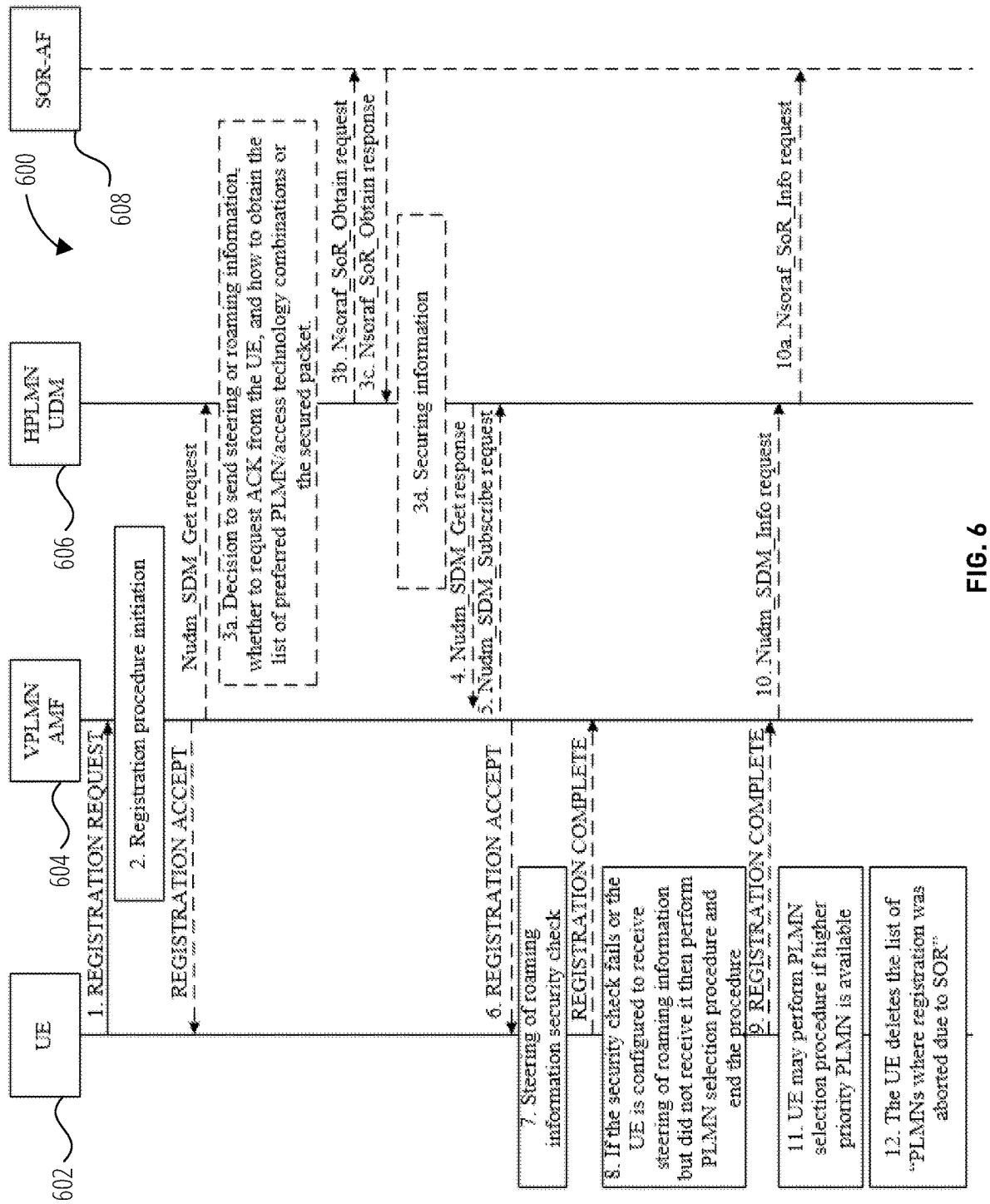
FIG. 6 illustrates a data flow diagram of an example method of steering a UE in a VPLM during registration in accordance with one embodiment.

FIG. 6 illustrates a data flow diagram 600 of an example method of steering a UE 602 in a VPLM during registration according to one embodiment. The illustrated method is based on the control plane solution for steering of roaming in 5GS described in 3GPP TS 23.122 Annex C, but which is modified according to certain embodiments described herein. A purpose of the control plane solution for steering of roaming in 5GS procedure is to allow the HPLMN to update the "Operator Controlled PLMN Selector with Access Technology" list in the UE 602 by providing the HPLMN protected list of preferred PLMN/access technology combinations via NAS signaling. If the selected PLMN is a VPLMN, the HPLMN can provide the steering of roaming information to the UE 602 using the control plane mechanism during and after registration. If the selected PLMN is the HPLMN, the HPLMN can provide the steering of roaming information to the UE 602 using the control plane mechanism after registration only. The HPLMN updates the "Operator Controlled PLMN Selector with Access Technology" based on the operator policies, which can be based on the registered VPLMN, the location of the UE 602, etc.

The HPLMN can configure their subscribed UE's USIM to indicate that the UE 602 is expected to receive the steering of roaming information due to initial registration or mobility registration triggered before successfully receiving the SOR container in current power cycle registration in a VPLMN.

At the same time the HPLMN will mark the UE 602 is expected to receive the steering of roaming information due to initial registration or mobility registration triggered before successfully receiving the SOR container in current power cycle in a VPLMN, in the subscription information in the UDM 606. In this case, it is mandatory for the HPLMN to provide the steering of roaming information to the UE 602 during initial registration or mobility registration triggered before successfully receiving the SOR container in current power cycle in a VPLMN. Otherwise if such configuration is not provided in the USIM, it is optional for the HPLMN to provide the steering of roaming information to the UE 602 during initial registration or mobility registration triggered before successfully receiving the SOR container in current power cycle (based on operator policy). In this example, the User Data Repository (UDR) is considered as part of the UDM 606.

As the HPLMN needs to consider certain criteria including the number of customers distributed through multiple VPLMNs in the same country or region, the list of the preferred PLMN/access technology combinations is not necessarily the same at all times and for all users. The list of the preferred PLMN/access technology combinations needs to be dynamically generated, e.g. generated on demand, by a dedicated steering of roaming application function (SOR-AF 608) providing operator specific data analytics solutions.

In order to support various deployment scenarios, the UDM 606 may support: using a list of preferred PLMN/access technology combinations or a secured packet which is or becomes available in the UDM 606; obtaining a list of preferred PLMN/access technology combinations or a secured packet from the SOR-AF 608; or both of the above. The HPLMN policy for the SOR-AF 608 invocation can be present in the UDM 606 only if the UDM 606 supports obtaining a list of preferred PLMN/access technology combinations or a secured packet from the SOR-AF 608.

If: the UE's USIM is configured to indicate that the UE 602 expects to receive the steering of roaming information during initial registration procedure but did not receive it or security check on the steering of roaming information fails; the current chosen VPLMN is not contained in the list of "PLMNs where registration was aborted due to SOR"; the current chosen VPLMN is not part of "User Controlled PLMN Selector with Access Technology" list; and the UE 602 is not in manual mode of operation; then the UE 602 will perform PLMN selection with the current VPLMN considered as lowest priority.

The VPLMN transparently forwards to the UE 602 the steering of roaming information received from HPLMN and to transparently forward to the HPLMN the acknowledgement of successful reception of the steering of roaming information received from UE 602, both while the UE 602 is trying to register onto the VPLMN, and after the UE 602 has registered onto the VPLMN. If the last received steering of roaming information contains the "list of preferred PLMN/access technology combinations" then the ME does not delete the "Operator Controlled PLMN Selector with Access Technology" list when the UE 602 is switched off. The ME deletes the "Operator Controlled PLMN Selector with Access Technology" list stored in the ME when a new USIM is inserted.

In the example shown in FIG. 6, the selected PLMN is the VPLMN and the AMF 604 is located in the selected VPLMN. For the illustrated steps discussed below, security protection may be described in 3GPP TS 33.501.

In step 1 (UE 602 to the VPLMN AMF 604), the UE initiates initial registration, emergency registration or mobility registration update procedure to the VPLMN AMF by sending REGISTRATION REQUEST message with the 5GS registration type IE indicating "initial registration", "emergency registration" or "mobility registration updating".

In step 2, upon receiving REGISTRATION REQUEST message, the VPLMN AMF 604 executes the registration procedure as defined in subclause 4.2.2.2.2 of 3GPP TS 23.502. As part of the registration procedure: (a) if the VPLMN AMF does not have subscription data for the UE 602, the VPLMN AMF invokes Nudm SDM Get service operation to the HPLMN UDM 606 to get amongst other information the Access and Mobility Subscription data for the UE (see step 14b in subclause 4.2.2.2.2 of 3GPP TS 23.502); or (b) if the VPLMN AMF already has subscription data for the UE and i) the 5GS registration type IE in the received REGISTRATION REQUEST message indicates "initial registration" or "mobility registration updating" and the "SoR Update Indicator for Initial Registration" field in the UE context is set to the UDM requests the AMF to retrieve SoR information when the UE performs NAS registration type "initial registration" or "mobility registration updating" as specified in table 5.2.2.2.2-1 of 3GPP TS 23.502); or ii) the 5GS registration type IE in the received REGISTRATION REQUEST message indicates "emergency registration" and the "SoR Update Indicator for Emergency Registration" field in the UE context is set to 'the UDM requests the AMF to retrieve SoR information when the UE performs NAS registration type "emergency registration"' as specified in table 5.2.2.2.2-1 of 3GPP TS 23.502); then the VPLMN AMF invokes Nudm_SDM_Get service operation message to the HPLMN UDM to retrieve the steering of roaming information (see step 14b in subclause 4.2.2.2.2 of 3GPP TS 23.502); otherwise the VPLMN AMF sends a REGISTRATION ACCEPT message without the steering of roaming information to the UE and steps 3a, 3b, 3c, 3d, 4, 5, 5a, 6 are skipped.

In step 3a, if the user subscription information indicates to send the steering of roaming information due to initial registration or mobility registration triggered before successfully receiving the SOR container in current power cycle in a VPLMN, then the HPLMN UDM 606 provides the steering of roaming information to the UE 602 when the UE 602 performs initial registration or mobility registration triggered before successfully receiving the SOR container in current power cycle in a VPLMN, otherwise the HPLMN UDM may provide the steering of roaming information to the UE, based on operator policy.

If the HPLMN UDM is to provide the steering of roaming information to the UE when the UE performs the registration in a VPLMN, and the HPLMN policy for the SOR-AF 608 invocation is absent then steps 3b and 3c are not performed.

If the HPLMN UDM is to provide the steering of roaming information to the UE when the UE performs the registration in a VPLMN, and the HPLMN policy for the SOR-AF invocation is present, then the HPLMN UDM obtains the list of preferred PLMN/access technology combinations or the secured packet from the SOR-AF using steps 3b and 3c.

In step 3b (HPLMN UDM 606 to the SOR-AF 608), Nsoraf_SoR_Obtain request (VPLMN ID, SUPI of the UE 602, access type (see 3GPP TS 29.571). The VPLMN ID and the access type parameters, indicating where the UE is registering, are stored in the HPLMN UDM.

In step 3c (SOR-AF 608 to the HPLMN UDM 606), Nsoraf_SoR_Obtain response (the list of preferred PLMN/access technology combinations, or the secured packet, or neither of them). Based on the information received in step 3b and any operator specific criteria, the SOR-AF may include the list of preferred PLMN/access technology combinations or the secured packet in the Nsoraf_SoR_Obtain response or may provide the Nsoraf_SoR_Obtain response with neither a list of preferred PLMN/access technology combinations nor a secured packet. In certain implementations, when the access type where the UE 602 is registering indicates 3GPP access, then the UE is registering over the NG-RAN access technology. Based on operator deployment and policy, if the UDM receives the list of preferred PLMN/ access technology combinations in the Nsoraf_SoR_Obtain response from the SOR-AF, and the UDM supports communication with SP-AF, it can send this list to SP-AF requesting it to provide this information in a secured packet as defined in 3GPP TS 29.544. The SOR-AF can include a different list of preferred PLMN/access technology combinations or a different secure packet for each Nsoraf_SoR_Obtain request even if the same VPLMN ID, the SUPI of the UE, and the access type are provided to the SOR-AF. The SOR-AF can subscribe to the HPLMN UDM to be notified about the changes of the roaming status of the UE identified by SUPI.

In step 3d), the HPLMN UDM 606 forms the steering of roaming information as specified in 3GPP TS 33.501 from the list of preferred PLMN/access technology combinations or the secured packet obtained in step 3a or the list of preferred PLMN/access technology combinations or the secured packet, obtained in step 3c. If: neither the list of preferred PLMN/access technology combinations nor the secured packet was obtained in steps 3a or 3c; or the SOR-AF 608 has not sent to the HPLMN UDM an Nsoraf_SoR_Obtain response (step 3c) within an operator defined time after the HPLMN UDM sending to the SOR-AF an Nsoraf_SoR_Obtain request (step 3b); and the UE 602 is performing initial registration in a VPLMN and the user subscription information indicates to send the steering of roaming information due to initial registration in a VPLMN, then the HPLMN UDM forms the steering of roaming information as specified in 3GPP TS 33.501 from the HPLMN indication that 'no change of the "Operator Controlled PLMN Selector with Access Technology" list stored in the UE is needed and thus no list of preferred PLMN/access technology combinations is provided'.

In step 4 (HPLMN UDM 606 to the VPLMN AMF 604), The HPLMN UDM sends a response to the Nudm SDM Get service operation to the VPLMN AMF, which includes the steering of roaming information within the Access and Mobility Subscription data. The Access and Mobility Subscription data type is defined in subclause 5.2.3.3.1 of 3GPP TS 23.502). The HPLMN may also request the UE 602 to acknowledge the successful security check of the received steering of roaming information, by providing the indication as part of the steering of roaming information in the Nudm_SDM_Get response service operation.

In step 5 (VPLMN AMF 604 to the HPLMN UDM 606), as part of the registration procedure, the VPLMN AMF also invokes Nudm_SDM_Subscribe service operation to the HPLMN UDM to subscribe to notification of changes of the subscription data received in step 4) including notification of updates of the steering of roaming information included in the Access and Mobility Subscription data (see step 14c in subclause 4.2.2.2.2 of 3GPP TS 23.502);

In step 6 (VPLMN AMF 604 to the UE 602), the VPLMN AMF transparently sends the received steering of roaming information to the UE in the REGISTRATION ACCEPT message.

In step 7, if the steering of roaming information is received and the security check is successful, then: (a) if the steering of roaming information contains a secured packet (see 3GPP TS 31.115): if the UDM 606 has not requested an acknowledgement from the UE 602 the UE 602 sends the REGISTRATION COMPLETE message without including an SOR transparent container; the ME uploads the secured packet to the USIM using procedures in 3GPP TS 31.111. If the UDM has not requested an acknowledgement from the UE and the ME receives a USAT REFRESH command qualifier (3GPP TS 31.111) of type "Steering of Roaming" it performs items a), b) and c) of the procedure for steering of roaming in subclause 4.4.6 and if the UE has a list of available and allowable PLMNs in the area and based on this list the UE determines that there is a higher priority PLMN than the selected VPLMN and the UE is in automatic network selection mode, then the UE either: i) release the current N1 NAS signaling connection locally and then attempt to obtain service on a higher priority PLMN as specified in subclause 4.4.3.3 by acting as if timer T that controls periodic attempts has expired. In this case, steps 8 to 11 are skipped. If the UE has an established emergency PDU session (see 3GPP TS 24.501), the receipt of the steering of roaming information does not trigger the release of the N1 NAS signaling connection. The UE releases the current N1 NAS signaling connection locally subsequently after the emergency PDU session is released; or ii) not release the current N1 NAS signaling connection locally and skip steps 8 to 10; (b) if the steering of roaming information contains the list of preferred PLMN/access technology combinations, the ME replaces the highest priority entries in the "Operator Controlled PLMN Selector with Access Technology" list stored in the ME with the received list of preferred PLMN/access technology combinations. Additionally, if the UDM has not requested an acknowledgement from the UE and if the UE has a list of available and allowable PLMNs in the area and based on this list the UE determines that there is a higher priority PLMN than the selected VPLMN and the UE is in automatic network selection mode, then the UE sends the REGISTRATION COMPLETE message to the serving AMF 604 without including an SOR transparent container and then either: i) release the current N1 NAS signaling connection locally and then attempt to obtain service on a higher priority PLMN as specified in subclause 4.4.3.3 by acting as if timer T that controls periodic attempts has expired. In this case, steps 8 to 11 are skipped. If the UE has an established emergency PDU session (see 3GPP TS 24.501), the receipt of the steering of roaming information does not trigger the release of the N1 NAS signaling connection. The UE releases the current N1 NAS signaling connection locally subsequently after the emergency PDU session is released; or ii) not release the current N1 NAS signaling connection locally and skip steps 8 and 10.

In step 8, if: (a) the UE's USIM is configured with indication that the UE 602 is to receive the steering of roaming information due to initial registration in a VPLMN, but neither the list of preferred PLMN/access technology combinations nor the secured packet nor the HPLMN indication that 'no change of the "Operator Controlled PLMN Selector with Access Technology" list stored in the UE is needed and thus no list of preferred PLMN/access technology combinations is provided' is received in the REGISTRATION ACCEPT message, when the UE performs initial registration in a VPLMN or if the steering of roaming information is received but the security check is not successful; and (b) the current chosen VPLMN is not contained in the list of "PLMNs where registration was aborted due to SOR", not part of "User Controlled PLMN Selector with Access Technology" list, the UE is not in manual mode of operation; then the UE sends the REGISTRATION COMPLETE message to the serving AMF 604 without including an SOR transparent container, release the current N1 NAS signaling connection locally, store the PLMN identity in the list of "PLMNs where registration was aborted due to SOR" and attempt to obtain service on a higher priority PLMN as specified in subclause 4.4.3.3 by acting as if timer T that controls periodic attempts has expired, with an exception that the current PLMN is considered as lowest priority, and skip steps 9 to 12. If the UE has an established emergency PDU session (see 3GPP TS 24.501), the UE releases the current N1 NAS signaling connection locally after the release of the emergency PDU session. When the UE is in the manual mode of operation or the current chosen VPLMN is part of the "User Controlled PLMN Selector with Access Technology" list, the UE stays on the VPLMN.

In step 9 (UE 602 to the VPLMN AMF 604), if the UDM 606 has requested an acknowledgement from the UE: the UE verified that the steering of roaming information has been provided by the HPLMN in step 7, the UE sends the REGISTRATION COMPLETE message to the serving AMF with an SOR transparent container including the UE acknowledgement; and if the steering of roaming information contained a secured packet and the security check was successful, then when the UE receives the USAT REFRESH command qualifier of type "Steering of Roaming", it performs items a), b) and c) of the procedure for steering of roaming in subclause 4.4.6.

In step 10 (VPLMN AMF 604 to the HPLMN UDM 606), if an SOR transparent container is received in the REGISTRATION COMPLETE message, the AMF uses the Nudm SDM Info service operation to provide the received SOR transparent container to the UDM. If the HPLMN decided that the UE 602 is to acknowledge the successful security check of the received steering of roaming information in step 4, the UDM verifies that the acknowledgement is provided by the UE as specified in 3GPP TS 33.501.

In step 10a (HPLMN UDM 606 to the SOR-AF 608), Nsoraf_SoR_Info (SUPI of the UE 602, successful delivery). If the HPLMN policy for the SOR-AF invocation is present and the HPLMN UDM received and verified the UE acknowledgement in step 10, then the HPLMN UDM informs the SOR-AF about successful delivery of the list of preferred PLMN/access technology combinations, or of the secured packet to the UE.

In step 11, if the UE 602 has a list of available PLMNs in the area and based on this list the UE determines that there is a higher priority PLMN than the selected VPLMN and the UE is in automatic network selection mode, then the UE attempts to obtain service on a higher priority PLMN as specified in subclause 4.4.3.3 by acting as if timer T that controls periodic attempts has expired after the release of the N1 NAS signaling connection. If the N1 NAS signaling connection is not released after implementation dependent time, the UE may locally release the N1 signaling connection except when the UE has an established emergency PDU session (see 3GPPTS 24.501.

In step 12, the UE 602 deletes the list of "PLMNs where registration was aborted due to SOR".

The list of "PLMNs where registration was aborted due to SOR" is deleted when the UE is switched off or the USIM is removed.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 7:
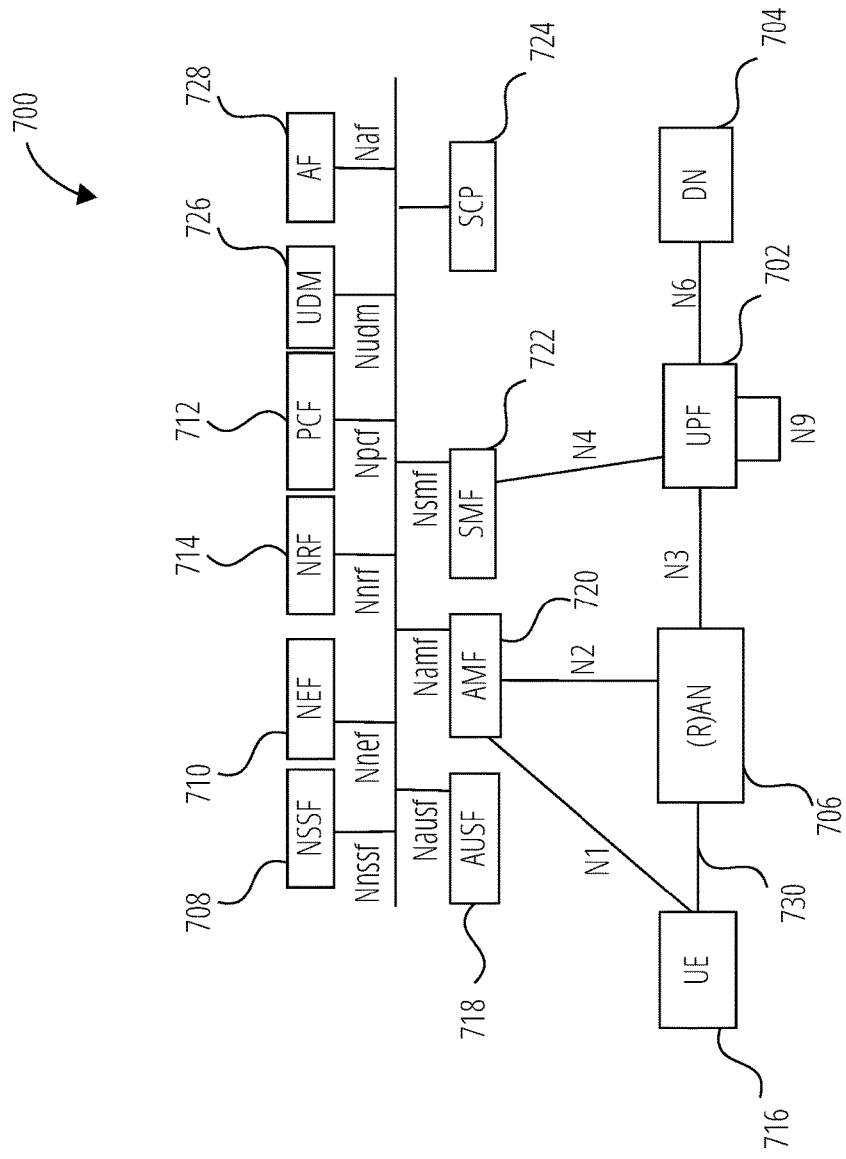
FIG. 7 illustrates an example service based architecture in accordance with certain embodiments.

FIG. 7 illustrates a service based architecture 700 in 5GS according to one embodiment. As described in 3GPP TS 23.501, the service based architecture 700 comprises NFs such as an NSSF 708, a NEF 710, an NRF 714, a PCF 712, a UDM 726, an AUSF 718, an AMF 720, an SMF 722, for communication with a UE 716, a (R)AN 706, a UPF 702, and a DN 704. The NFs and NF services can communicate directly, referred to as Direct Communication, or indirectly via a SCP 724, referred to as Indirect Communication. FIG. 7 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 7 are described below.

The NSSF 708 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 710 supports exposure of capabilities and events. NF capabilities and events may be securely exposed by the NEF 710 (e.g., for 3rd party, Application Functions, and/or Edge Computing). The NEF 710 may store/retrieve information as structured data using a standardized interface (Nudr) to a UDR. The NEF 710 may also secure provision of information from an external application to 3GPP network and may provide for the Application Functions to securely provide information to the 3GPP network (e.g., expected UE behavior, SGLAN group information, and service specific information), wherein the NEF 710 may authenticate and authorize and assist in throttling the Application Functions. The NEF 710 may provide translation of internal-external information by translating between information exchanged with the AF and information exchanged with the internal network function. For example, the NEF 710 translates between an AF-Service-Identifier and internal 5G Core information such as DNN and S-NSSAI. The NEF 710 may handle masking of network and user sensitive information to external AF's according to the network policy. The NEF 710 may receive information from other network functions (based on exposed capabilities of other network functions), and stores the received information as structured data using a standardized interface to a UDR. The stored information can be accessed and re-exposed by the NEF 710 to other network functions and Application Functions, and used for other purposes such as analytics. For external exposure of services related to specific UE(s), the NEF 710 may reside in the HPLMN. Depending on operator agreements, the NEF 710 in the HPLMN may have interface (s) with NF(s) in the VPLMN. When a UE is capable of switching between EPC and 5GC, an SCEF+NEF may be used for service exposure.

The NRF 714 supports service discovery function by receiving an NF Discovery Request from an NF instance or SCP and providing the information of the discovered NF instances to the NF instance or SCP. The NRF 714 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 712 supports a unified policy framework to govern network behavior. The PCF 712 provides policy rules to Control Plane function(s) to enforce them. The PCF 712 accesses subscription information relevant for policy decisions in a Unified Data Repository (UDR). The PCF 712 may access the UDR located in the same PLMN as the PCF.

The UDM 726 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 726 uses subscription data (including authentication data) that may be stored in a UDR, in which case a UDM implements the application logic and may not require an internal user data storage and several different UDMs may serve the same user in different transactions. The UDM 726 may be located in the HPLMN of the subscribers it serves, and may access the information of the UDR located in the same PLMN.

The AF 728 interacts with the Core Network to provide services that, for example, support the following: application influence on traffic routing; accessing the NEF 710; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 710 to interact with relevant Network Functions.

The AUSF 718 supports authentication for 3GPP access and untrusted non-3GPP access. The AUSF 718 may also provide support for Network Slice-Specific Authentication and Authorization.

The AMF 720 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 720. Regardless of the number of Network functions, in certain embodiments there is only one NAS interface instance per access network between the UE and the CN, terminated at one of the Network functions that implements at least NAS security and Mobility Management. The AMF 720 may also include policy related functionalities.

In addition to the functionalities described above, the AMF 720 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 722 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAB (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 722 may include policy related functionalities.

The SCP 724 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 724 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 716 may include a device with radio communication capabilities. For example, the UE 716 may comprise a smartphone (e.g., handheld touchscreen mobile computing devices connectable to one or more cellular networks). The UE 716 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 716 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 716 may be configured to connect or communicatively couple with the (R)AN 706 through a radio interface 730, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 716 and the (R)AN 706 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 706 to the UE 716 and a UL transmission may be from the UE 716 to the (R)AN 706. The UE 716 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 706 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 706 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 706) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 716 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 702 may act as an anchor point for intra-RAT and inter-RAT mobility, an external PDU session point of interconnect to the DN 704, and a branching point to support multi-homed PDU session. The UPF 702 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 702 may include an uplink classifier to support routing traffic flows to a data network. The DN 704 may represent various network operator services, Internet access, or third party services. The DN 704 may include, for example, an application server.

Figure 8:
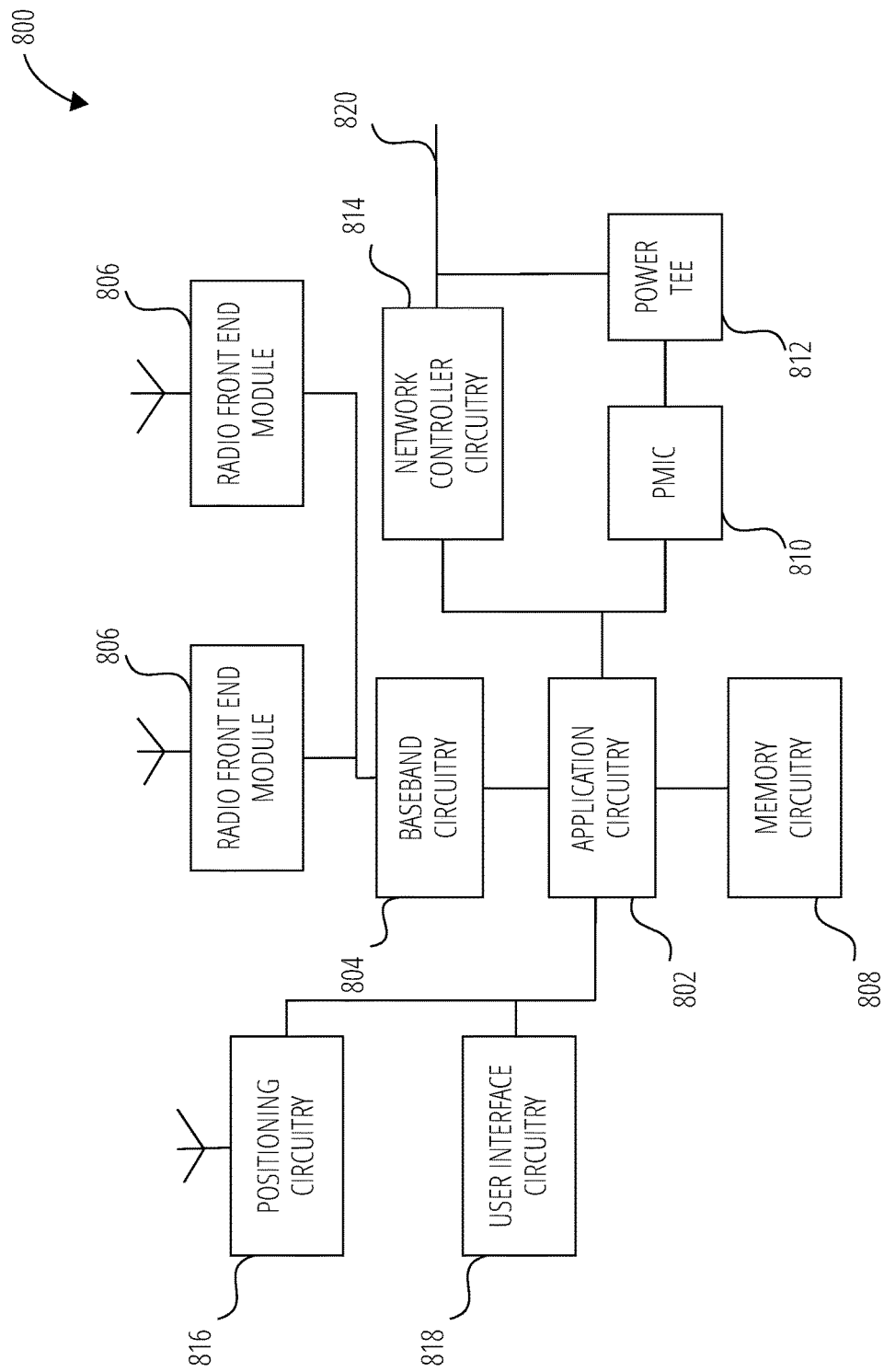
FIG. 8 illustrates an infrastructure equipment in accordance with one embodiment.

FIG. 8 illustrates an example of infrastructure equipment 800 in accordance with various embodiments. The infrastructure equipment 800 may be implemented as a base station, radio head, RAN node, AN, application server, and/or any other element/device discussed herein. In other examples, the infrastructure equipment 800 could be implemented in or by a UE.

The infrastructure equipment 800 includes application circuitry 802, baseband circuitry 804, one or more radio front end module 806 (RFEM), memory circuitry 808, power management integrated circuitry (shown as PMIC 810), power tee circuitry 812, network controller circuitry 814, network interface connector 820, satellite positioning circuitry 816, and user interface circuitry 818. In some embodiments, the device infrastructure equipment 800 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 802 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 802 may be coupled with or may include memory/storage elements and may be configured to execute instructions stored in the memory/storage to enable various applications or operating systems to run on the infrastructure equipment 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 802 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 802 may comprise, or may be, a special-purpose processor/controller to operate according to the various embodiments herein. As examples, the processor(s) of application circuitry 802 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium(™), Inc.; a MIPS-based design from MIPS Technologies, Inc. such as MIPS Warrior P-class processors; and/or the like. In some embodiments, the infrastructure equipment 800 may not utilize application circuitry 802, and instead may include a special-purpose processor/controller to process IP data received from an EPC or 5GC, for example.

In some implementations, the application circuitry 802 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 802 may comprise logic blocks or logic fabric, and other interconnected resources that may be programmed to perform various functions, such as the procedures, methods, functions, etc. of the various embodiments discussed herein. In such embodiments, the circuitry of application circuitry 802 may include memory cells (e.g., erasable programmable read-only memory (EPROM), electrically erasable programmable read-only memory (EEPROM), flash memory, static memory (e.g., static random access memory(SRAM), anti-fuses, etc.)) used to store logic blocks, logic fabric, data, etc. in look-up-tables (LUTs) and the like. The baseband circuitry 804 may be implemented, for example, as a solder-down substrate including one or more integrated circuits, a single packaged integrated circuit soldered to a main circuit board or a multi-chip module containing two or more integrated circuits.

The user interface circuitry 818 may include one or more user interfaces designed to enable user interaction with the infrastructure equipment 800 or peripheral component interfaces designed to enable peripheral component interaction with the infrastructure equipment 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 806 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 806, which incorporates both mmWave antennas and sub-mmWave.

The memory circuitry 808 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory(MRAM), etc., and may incorporate the three-dimensional (3D)cross-point (XPOINT) memories from Intel® and Micron®. The memory circuitry 808 may be implemented as one or more of solder down packaged integrated circuits, socketed memory modules and plug-in memory cards.

The PMIC 810 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 812 may provide for electrical power drawn from a network cable to provide both power supply and data connectivity to the infrastructure equipment 800 using a single cable.

The network controller circuitry 814 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 820 using a physical connection, which may be electrical (commonly referred to as a "copper interconnect"), optical, or wireless. The network controller circuitry 814 may include one or more dedicated processors and/or FPGAs to communicate using one or more of the aforementioned protocols. In some implementations, the network controller circuitry 814 may include multiple controllers to provide connectivity to other networks using the same or different protocols.

The positioning circuitry 816 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS),etc.), or the like. The positioning circuitry 816 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 816 may include a Micro-Technology for Positioning, Navigation, and Timing (Micro-PNT) IC that uses a master timing clock to perform position tracking/estimation without GNSS assistance. The positioning circuitry 816 may also be part of, or interact with, the baseband circuitry 804 and/or radio front end module 806 to communicate with the nodes and components of the positioning network. The positioning circuitry 816 may also provide position data and/or time data to the application circuitry 802, which may use the data to synchronize operations with various infrastructure, or the like. The components shown by FIG. 8 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 9:
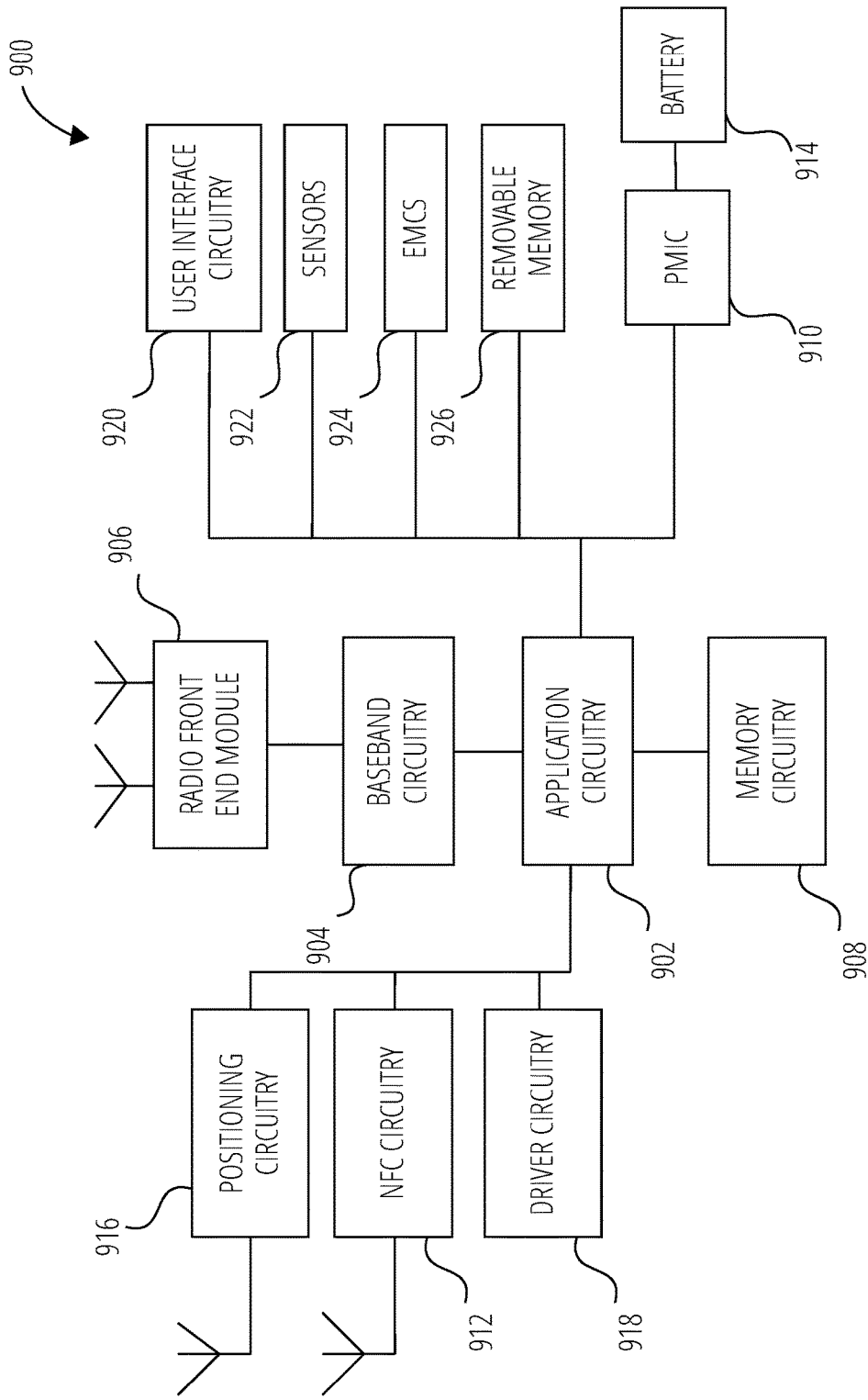
FIG. 9 illustrates a platform in accordance with one embodiment.

FIG. 9 illustrates an example of a platform 900 in accordance with various embodiments. In embodiments, the computer platform 900 may be suitable for use as UEs, application servers, and/or any other element/device discussed herein. The platform 900 may include any combinations of the components shown in the example. The components of platform 900 may be implemented as integrated circuits (ICs), portions thereof, discrete electronic devices, or other modules, logic, hardware, software, firmware, or a combination thereof adapted in the computer platform 900, or as components otherwise incorporated within a chassis of a larger system. The block diagram of FIG. 9 is intended to show a high level view of components of the computer platform 900. However, some of the components shown may be omitted, additional components may be present, and different arrangement of the components shown may occur in other implementations.

Application circuitry 902 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 902 may be coupled with or may include memory/storage elements and may be configured to execute instructions stored in the memory/storage to enable various applications or operating systems to run on the platform 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 902 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 902 may comprise, or may be, a special-purpose processor/controller to operate according to the various embodiments herein.

As examples, the processor(s) of application circuitry 902 may include an Intel® Architecture Core™ based processor, such as a Quark™, an Atom™, an i3, an i5, an i7, or an MCU-class processor, or another such processor available from Intel® Corporation. The processors of the application circuitry 902 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 902 may be a part of a system on a chip (SoC) in which the application circuitry 902 and other components are formed into a single integrated circuit, or a single package, such as the Edison™ or Galileo™ SoC boards from Intel® Corporation.

Additionally or alternatively, application circuitry 902 may include circuitry such as, but not limited to, one or more a field-programmable devices (FPDs) such as FPGAs and the like; programmable logic devices(PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 902 may comprise logic blocks or logic fabric, and other interconnected resources that may be programmed to perform various functions, such as the procedures, methods, functions, etc. of the various embodiments discussed herein. In such embodiments, the circuitry of application circuitry 902 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 904 may be implemented, for example, as a solder-down substrate including one or more integrated circuits, a single packaged integrated circuit soldered to a main circuit board or a multi-chip module containing two or more integrated circuits.

The radio front end module 906 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 906, which incorporates both mmWave antennas and sub-mmWave.

The memory circuitry 908 may include any number and type of memory devices used to provide for a given amount of system memory. As examples, the memory circuitry 908 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 908 may be developed in accordance with a Joint Electron Devices Engineering Council (JEDEC) low power double data rate (LPDDR)-based design, such as LPDDR2, LPDDR3, LPDDR4, or the like. Memory circuitry 908 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 908 maybe on-die memory or registers associated with the application circuitry 902. To provide for persistent storage of information such as data, applications, operating systems and so forth, memory circuitry 908 may include one or more mass storage devices, which may include, inter alia, a solid state disk drive (SSDD), hard disk drive(HDD), a microHDD, resistance change memories, phase change memories, holographic memories, or chemical memories, among others. For example, the computer platform 900 may incorporate the three-dimensional (3D) cross-point (XPOINT) memories from Intel® and Micron®.

The removable memory 926 may include devices, circuitry, enclosures/housings, ports or receptacles, etc. used to couple portable data storage devices with the platform 900. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 900 may also include interface circuitry (not shown) that is used to connect external devices with the platform 900. The external devices connected to the platform 900 via the interface circuitry include sensors 922 and electro-mechanical components (shown as EMCs 924), as well as removable memory devices coupled to removable memory 926.

The sensors 922 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 924 include devices, modules, or subsystems whose purpose is to enable platform 900 to change its state, position, and/or orientation, or move or control a mechanism or (sub)system. Additionally, EMCs 924 may be configured to generate and send messages/signaling to other components of the platform 900 to indicate a current state of the EMCs 924. Examples of the EMCs 924 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 900 is configured to operate one or more EMCs 924 based on one or more captured events and/or instructions or control signals received from a service provider and/or various clients. In some implementations, the interface circuitry may connect the platform 900 with positioning circuitry 916. The positioning circuitry 916 includes circuitry to receive and decode signals transmitted/broadcasted by a positioning network of a GNSS. Examples of navigation satellite constellations (or GNSS)include United States' GPS, Russia's GLONASS, the European Union's Galileo system, China's BeiDou Navigation Satellite System, a regional navigation system or GNSS augmentation system(e.g., NAVIC), Japan's QZSS, France's DORIS, etc.), or the like. The positioning circuitry 916 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 916 may include a Micro-PNT IC that uses a master timing clock to perform position tracking/estimation without GNSS assistance. The positioning circuitry 916 may also be part of, or interact with, the baseband circuitry 904 and/or radio front end module 906 to communicate with the nodes and components of the positioning network. The positioning circuitry 916 may also provide position data and/or time data to the application circuitry 902, which may use the data to synchronize operations with various infrastructure (e.g., radio base stations), for turn-by-turn navigation applications, or the like.

In some implementations, the interface circuitry may connect the platform 900 with Near-Field Communication circuitry (shown as NFC circuitry 912). The NFC circuitry 912 is configured to provide contactless, short-range communications based on radio frequency identification (RFID) standards, wherein magnetic field induction is used to enable communication between NFC circuitry 912 and NFC-enabled devices external to the platform 900 (e.g., an "NFC touchpoint"). NFC circuitry 912 comprises an NFC controller coupled with an antenna element and a processor coupled with the NFC controller. The NFC controller may be a chip/IC providing NFC functionalities to the NFC circuitry 912 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 912, or initiate data transfer between the NFC circuitry 912 and another active NFC device (e.g., a smartphone or an NFC-enabled POS terminal) that is proximate to the platform 900.

The driver circuitry 918 may include software and hardware elements that operate to control particular devices that are embedded in the platform 900, attached to the platform 900, or otherwise communicatively coupled with the platform 900. The driver circuitry 918 may include individual drivers allowing other components of the platform 900 to interact with or control various input/output (I/O) devices that may be present within, or connected to, the platform 900. For example, driver circuitry 918 may include a display driver to control and allow access to a display device, a touchscreen driver to control and allow access to a touchscreen interface of the platform 900, sensor drivers to obtain sensor readings of sensors 922 and control and allow access to sensors 922, EMC drivers to obtain actuator positions of the EMCs 924 and/or control and allow access to the EMCs 924, a camera driver to control and allow access to an embedded image capture device, audio drivers to control and allow access to one or more audio devices.

The power management integrated circuitry (shown as PMIC 910) (also referred to as "power management circuitry") may manage power provided to various components of the platform 900. In particular, with respect to the baseband circuitry 904, the PMIC 910 may control power-source selection, voltage scaling, battery charging, or DC-to-DC conversion. The PMIC 910 may often be included when the platform 900 is capable of being powered by a battery 914, for example, when the device is included in a UE.

In some embodiments, the PMIC 910 may control, or otherwise be part of, various power saving mechanisms of the platform 900. For example, if the platform 900 is in an RRC_Connected state, where it is still connected to the RAN node as it expects to receive traffic shortly, then it may enter a state known as Discontinuous Reception Mode (DRX) after a period of inactivity. During this state, the platform 900 may power down for brief intervals of time and thus save power. If there is no data traffic activity for an extended period of time, then the platform 900 may transition off to an RRC_Idle state, where it disconnects from the network and does not perform operations such as channel quality feedback, handover, etc. The platform 900 goes into a very low power state and it performs paging where again it periodically wakes up to listen to the network and then powers down again. The platform 900 may not receive data in this state; in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 914 may power the platform 900, although in some examples the platform 900 may be mounted deployed in a fixed location, and may have a power supply coupled to an electrical grid. The battery 914 may be a lithium ion battery, a metal-air battery, such as a zinc-air battery, an aluminum-air battery, a lithium-air battery, and the like. In some implementations, such as in V2X applications, the battery 914 may be a typical lead-acid automotive battery.

In some implementations, the battery 914 may be a "smart battery," which includes or is coupled with a Battery Management System (BMS) or battery monitoring integrated circuitry. The BMS may be included in the platform 900 to track the state of charge (SoCh) of the battery 914. The BMS may be used to monitor other parameters of the battery 914 to provide failure predictions, such as the state of health (SoH) and the state of function (SoF) of the battery 914. The BMS may communicate the information of the battery 914 to the application circuitry 902 or other components of the platform 900. The BMS may also include an analog-to-digital (ADC) convertor that allows the application circuitry 902 to directly monitor the voltage of the battery 914 or the current flow from the battery 914. The battery parameters may be used to determine actions that the platform 900 may perform, such as transmission frequency, network operation, sensing frequency, and the like.

A power block, or other power supply coupled to an electrical grid may be coupled with the BMS to charge the battery 914. In some examples, the power block may be replaced with a wireless power receiver to obtain the power wirelessly, for example, through a loop antenna in the computer platform 900. In these examples, a wireless battery charging circuit may be included in the BMS. The specific charging circuits chosen may depend on the size of the battery 914, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 920 includes various input/output (I/O) devices present within, or connected to, the platform 900, and includes one or more user interfaces designed to enable user interaction with the platform 900 and/or peripheral component interfaces designed to enable peripheral component interaction with the platform 900. The user interface circuitry 920 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 900. The output device circuitry may also include speakers or other audio emitting devices, printer(s), and/or the like. In some embodiments, the sensors 922 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 900 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 10:
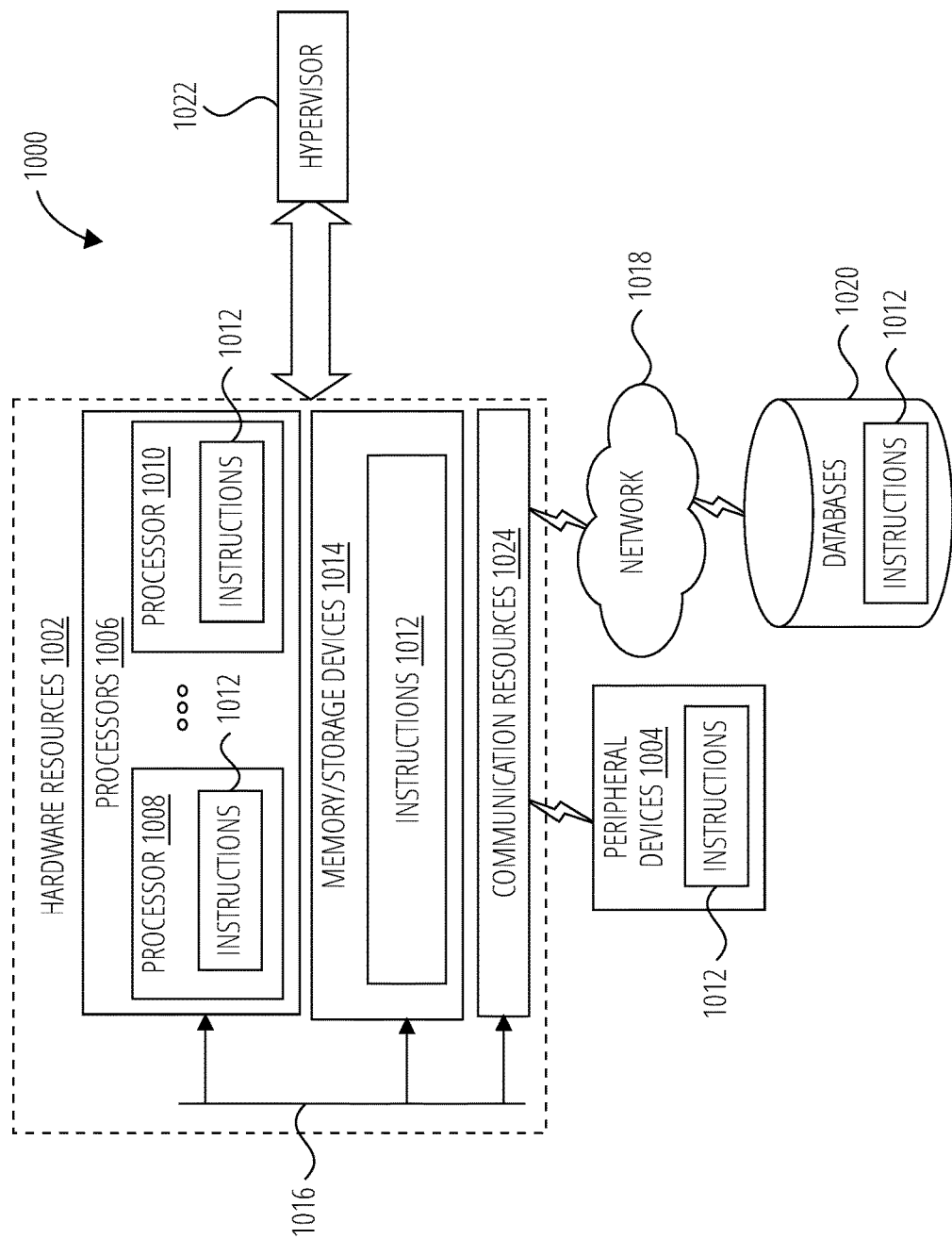
FIG. 10 illustrates components in accordance with one embodiment.

FIG. 10 is a block diagram illustrating components 1000, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1002 including one or more processors 1006 (or processor cores), one or more memory/storage devices 1014, and one or more communication resources 1024, each of which may be communicatively coupled via a bus 1016. For embodiments where node virtualization (e.g., NFV) is utilized, a hypervisor 1022 may be executed to provide an execution environment for one or more network slices/sub-slices to utilize the hardware resources 1002.

The processors 1006 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1008 and a processor 1010.

The memory/storage devices 1014 may include main memory, disk storage, or any suitable combination thereof. The memory/storage devices 1014 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1024 may include interconnection or network interface components or other suitable devices to communicate with one or more peripheral devices 1004 or one or more databases 1020 via a network 1018. For example, the communication resources 1024 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1012 may comprise software, a program, an application, an applet, an app, or other executable code for causing at least any of the processors 1006 to perform any one or more of the methodologies discussed herein. The instructions 1012 may reside, completely or partially, within at least one of the processors 1006 (e.g., within the processor's cache memory), the memory/storage devices 1014, or any suitable combination thereof. Furthermore, any portion of the instructions 1012 may be transferred to the hardware resources 1002 from any combination of the peripheral devices 1004 or the databases 1020. Accordingly, the memory of the processors 1006, the memory/storage devices 1014, the peripheral devices 1004, and the databases 1020 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method for a UE to communicate in a public land mobile network (PLMN). The method includes: generating, by the UE, a registration request message to send to a visited PLMN (VPLMN), the registration request message comprising a registration type parameter indicating a mobility registration update; processing, at the UE, a registration accept message from the VPLMN; determining, by the UE, whether the registration accept message comprises valid steering of roaming (SoR) information from a home PLMN (HPLMN); and in response to the UE being configured to receive the SoR information during the mobility registration procedure and the UE not having received the SoR information during a current power cycle of the UE, selectively performing a PLMN selection procedure based on whether the registration accept message comprises the valid SoR information from the HPLMN.

Example 2 includes the method of Example 1, wherein a subscriber identification module (SIM) or a universal SIM (USIM) of the UE is configured with an indication that the UE is to receive a SoR transparent container in the registration accept message, the SoR transparent container comprising the SoR information.

Example 3 includes the method of Example 2, wherein determining whether the registration accept message comprises the secure copy of the SoR information from the HPLMN includes determining whether the SoR transparent container successfully passes an integrity check.

Example 4 includes the method of Example 1, wherein the SoR information further comprises a prioritized list of preferred PLMNs or preferred PLMN and access technology combinations, and wherein selectively performing the PLMN selection procedure based on whether the registration accept message comprises the secure copy of the SoR information from the HPLMN comprises: determining that the registration accept message does not include the SoR information or that the SoR information has been altered by the VPLMN; setting the VPLMN as a lowest priority PLMN in a local list stored in the UE; locally releasing a non-access stratum (NAS) signaling connection after sending a registration complete message to the VPLMN; and performing the PLMN selection procedure based on the local list to attempt registration with a different PLMN.

Example 5 includes the method of Example 1, wherein the SoR information further comprises a prioritized list of preferred PLMNs or preferred PLMN and access technology combinations, and wherein selectively performing the PLMN selection procedure based on whether the registration accept message comprises the secure copy of the SoR information from the HPLMN comprises: determining that the registration accept message includes the SoR information and that the SoR information successfully passes an integrity check; and performing the PLMN selection procedure based on the prioritized list.

Example 6 includes the method of Example 5, wherein the SoR information includes a list type indicator that indicates the prioritized list is a PLMN identifier (ID) and access technology list, and wherein the method further comprises replacing one or more highest priority entries in a local list stored in the UE with entries from the prioritized list.

Example 7 includes the method of Example 5, wherein the SoR information includes a list type indicator that indicates the prioritized list comprises a secured packet received a short message service (SMS) message, and wherein the method further comprises: processing the SMS message as if it is received with a protocol identifier set to subscriber identification module (SIM) data download, data coding scheme set to class 2 message, and SMS payload as secured packet contents of an SoR transparent container information element (IE); and forwarding the SMS payload to a universal integrated circuit card (UICC).

Example 8 is a method for a UE. The method includes: triggering a first initial registration procedure with a first visited public land mobile network (VPLMN); determining that a registration accept message from the first VPLMN does not include valid steering of roaming (SoR) information; releasing a connection with the first VPLMN; and instead of triggering a mobility registration or a periodic registration with a second VPLMN, attempting a second initial registration procedure with the second VPLMN.

Example 9 includes the method of Example 8, further comprising refraining from triggering the mobility registration or the periodic registration in the first VPLMN, the second VPLMN, or another VPLMN until the valid SoR information is received as long as a subscriber identification module (SIM) or a universal SIM (USIM) of the UE is configured with an indication that the UE is expected to receive the valid SoR information due to initial registration in a VPLMN.

Example 10 includes the method of Example 8, wherein the SoR information comprises a prioritized list of preferred PLMNs or preferred PLMN and access technology combinations.

Example 11 is a method for an access and mobility management function (AMF) in a wireless network. The method includes: receiving, at the AMF, a registration request message from a user equipment (UE), the registration request message comprising a registration type parameter indicating a mobility registration update; in response to the registration request message, at the AMF, performing a mobility registration procedure for the UE in a visited public land mobile network (VPLMN), the registration procedure including receiving and storing UE context information at the AMF; determining that the UE context information includes a steering of roaming (SoR) indicator for mobility registration indicating that a unified data management (UDM) of a home public land mobile network (HPLMN) requests the VPLMN to retrieve SoR information in response to the registration type parameter indicating the mobility registration update when a SoR container has not been delivered to the UE in a previous registration; and in response to the SoR indicator for mobility registration, retrieving the SoR information from the UDM and delivering the SoR information to the UE in a registration accept message.

Example 12 includes the method of Example 11, wherein retrieving the SoR information from the UDM comprises invoking a Nudm_SDM_Get service operation message to the UDM to retrieve the SoR information.

Example 13 includes the method of Example 11, where delivering the SoR information to the UE comprises delivering the SoR container to the UE.

Example 14 includes the method of Example 11, wherein the SoR information comprises a prioritized list of preferred PLMNs or preferred PLMN and access technology combinations.

Example 15 includes the method of Example 14, wherein the SoR information further includes a list type indicator that indicates the prioritized list is one of a PLMN identifier (ID) and access technology list or a secured packet.

Example 16 is a method for a home public land mobile network (HPLMN). The method includes: configuring a user equipment (UE) to operate according to a steering of roaming (SoR) configuration, wherein the SoR configuration comprises configuring the UE to determine whether SoR information is included in a registration accept message associated with a mobility registration in a visited public land mobile network (VPLMN); configuring UE context information to include an SoR indicator for mobility registration indicating that the VPLMN is requested to retrieve the SoR information in response to a registration type parameter indicating a mobility registration update when a SoR container has not been delivered to the UE in a previous registration; and in response to a request from the VPLMN, providing the SoR information in the SoR container to the VPLMN to forward to the UE.

Example 17 includes the method of Example 16, further comprising securing the SoR container using a key shared with the UE.

Example 18 includes the method of Example 16, wherein the SoR configuration further comprises configuring the UE to lower a priority of the VPLMN, if the UE determines that the SoR container is not in the registration accept message associated with a mobility registration in the VPLMN or that the SoR container failed an integrity check.

Example 19 includes the method of Example 16, wherein the SoR information comprises a prioritized list of preferred PLMNs or preferred PLMN and access technology combinations.

Example 20 includes the method of Example 16, wherein the SoR information further includes a list type indicator that indicates the prioritized list is one of a PLMN identifier (ID) and access technology list or a secured packet.

Example 21 is a UE comprising a processor and a memory. The memory stores instructions that, when executed by the processor, configures the UE to: generate, by the UE, a registration request message to send to a visited PLMN (VPLMN), the registration request message comprising a registration type parameter indicating a mobility registration update; process, at the UE, a registration accept message from the VPLMN; determine, by the UE, whether the registration accept message comprises valid steering of roaming (SoR) information from a home PLMN (HPLMN); and in response to the UE being configured to receive the SoR information during the mobility registration procedure and the UE not having received the SoR information during a current power cycle of the UE, selectively perform a PLMN selection procedure based on whether the registration accept message comprises the valid SoR information from the HPLMN.

Example 22 includes the UE of Example 21, wherein a subscriber identification module (SIM) or a universal SIM (USIM) of the UE is configured with an indication that the UE is to receive a SoR transparent container in the registration accept message, the SoR transparent container comprising the SoR information.

Example 23 includes the UE of Example 22, wherein determine whether the registration accept message comprises the secure copy of the SoR information from the HPLMN includes determining whether the SoR transparent container successfully passes an integrity check.

Example 24 includes the UE of Example 21, wherein the SoR information further comprises a prioritized list of preferred PLMNs or preferred PLMN and access technology combinations, and wherein selectively perform the PLMN selection procedure based on whether the registration accept message comprises the secure copy of the SoR information from the HPLMN comprises: determine that the registration accept message does not include the SoR information or that the SoR information has been altered by the VPLMN; set the VPLMN as a lowest priority PLMN in a local list stored in the UE; locally release a non-access stratum (NAS) signaling connection after sending a registration complete message to the VPLMN; and perform the PLMN selection procedure based on the local list to attempt registration with a different PLMN.

Example 25 includes the UE of Example 21, wherein the SoR information further comprises a prioritized list of preferred PLMNs or preferred PLMN and access technology combinations, and wherein selectively perform the PLMN selection procedure based on whether the registration accept message comprises the secure copy of the SoR information from the HPLMN comprises: determine that the registration accept message includes the SoR information and that the SoR information successfully passes an integrity check; and perform the PLMN selection procedure based on the prioritized list.

Example 26 includes the UE of Example 25, wherein the SoR information includes a list type indicator that indicates the prioritized list is a PLMN identifier (ID) and access technology list, and wherein the method further comprises replace one or more highest priority entries in a local list stored in the UE with entries from the prioritized list.

Example 27 includes the UE of Example 25, wherein the SoR information includes a list type indicator that indicates the prioritized list comprises a secured packet received a short message service (SMS) message, and wherein the method further comprises: process the SMS message as if it is received with a protocol identifier set to subscriber identification module (SIM) data download, data coding scheme set to class 2 message, and SMS payload as secured packet contents of an SoR transparent container information element (IE); and forward the SMS payload to a universal integrated circuit card (UICC).

Example 28 is a non-transitory computer-readable storage medium, the computer-readable storage medium including instructions that when executed by a computer, cause the computer to: generate, by the UE, a registration request message to send to a visited PLMN (VPLMN), the registration request message comprising a registration type parameter indicating a mobility registration update; process, at the UE, a registration accept message from the VPLMN; determine, by the UE, whether the registration accept message comprises valid steering of roaming (SoR) information from a home PLMN (HPLMN); and in response to the UE being configured to receive the SoR information during the mobility registration procedure and the UE not having received the SoR information during a current power cycle of the UE, selectively perform a PLMN selection procedure based on whether the registration accept message comprises the valid SoR information from the HPLMN.

Example 29 includes the computer-readable storage medium of Example 28, wherein a subscriber identification module (SIM) or a universal SIM (USIM) of the UE is configured with an indication that the UE is to receive a SoR transparent container in the registration accept message, the SoR transparent container comprising the SoR information.

Example 30 includes the computer-readable storage medium of Example 29, wherein determine whether the registration accept message comprises the secure copy of the SoR information from the HPLMN includes determining whether the SoR transparent container successfully passes an integrity check.

Example 31 includes the computer-readable storage medium of Example 28, wherein the SoR information further comprises a prioritized list of preferred PLMNs or preferred PLMN and access technology combinations, and wherein selectively perform the PLMN selection procedure based on whether the registration accept message comprises the secure copy of the SoR information from the HPLMN comprises: determine that the registration accept message does not include the SoR information or that the SoR information has been altered by the VPLMN; set the VPLMN as a lowest priority PLMN in a local list stored in the UE; locally release a non-access stratum (NAS) signaling connection after sending a registration complete message to the VPLMN; and perform the PLMN selection procedure based on the local list to attempt registration with a different PLMN.

Example 32 includes the computer-readable storage medium of Example 28, wherein the SoR information further comprises a prioritized list of preferred PLMNs or preferred PLMN and access technology combinations, and wherein selectively perform the PLMN selection procedure based on whether the registration accept message comprises the secure copy of the SoR information from the HPLMN comprises: determine that the registration accept message includes the SoR information and that the SoR information successfully passes an integrity check; and perform the PLMN selection procedure based on the prioritized list.

Example 33 includes the computer-readable storage medium of Example 32, wherein the SoR information includes a list type indicator that indicates the prioritized list is a PLMN identifier (ID) and access technology list, and wherein the method further comprises replace one or more highest priority entries in a local list stored in the UE with entries from the prioritized list.

Example 34 includes the computer-readable storage medium of Example 32, wherein the SoR information includes a list type indicator that indicates the prioritized list comprises a secured packet received a short message service (SMS) message, and wherein the method further comprises: process the SMS message as if it is received with a protocol identifier set to subscriber identification module (SIM) data download, data coding scheme set to class 2 message, and SMS payload as secured packet contents of an SoR transparent container information element (IE); and forward the SMS payload to a universal integrated circuit card (UICC).

Example 35 is an apparatus for an AMF. The apparatus comprising: a processor; and a memory storing instructions that, when executed by the processor, configure the apparatus to: receive, at the AMF, a registration request message from a user equipment (UE), the registration request message comprising a registration type parameter indicating a mobility registration update; in response to the registration request message, at the AMF, perform a mobility registration procedure for the UE in a visited public land mobile network (VPLMN), the registration procedure including receiving and storing UE context information at the AMF; determine that the UE context information includes a steering of roaming (SoR) indicator for mobility registration indicating that a unified data management (UDM) of a home public land mobile network (HPLMN) requests the VPLMN to retrieve SoR information in response to the registration type parameter indicating the mobility registration update when a SoR container has not been delivered to the UE in a previous registration; and in response to the SoR indicator for mobility registration, retrieve the SoR information from the UDM and delivering the SoR information to the UE in a registration accept message.

Example 36 includes the computing apparatus of Example 35, wherein retrieving the SoR information from the UDM comprises invoke a Nudm_SDM_Get service operation message to the UDM to retrieve the SoR information.

Example 37 includes the computing apparatus of Example 35, where deliver the SoR information to the UE comprises delivering the SoR container to the UE.

Example 38 includes the computing apparatus of Example 35, wherein the SoR information comprises a prioritized list of preferred PLMNs or preferred PLMN and access technology combinations.

Example 39 includes the computing apparatus of Example 38, wherein the SoR information further includes a list type indicator that indicates the prioritized list is one of a PLMN identifier (ID) and access technology list or a secured packet.

Example 40 is a non-transitory computer-readable storage medium, the computer-readable storage medium including instructions that when executed by a processor of an AMF computer, cause the computer to: receive, at the AMF, a registration request message from a user equipment (UE), the registration request message comprising a registration type parameter indicating a mobility registration update; in response to the registration request message, at the AMF, perform a mobility registration procedure for the UE in a visited public land mobile network (VPLMN), the registration procedure including receiving and storing UE context information at the AMF; determine that the UE context information includes a steering of roaming (SoR) indicator for mobility registration indicating that a unified data management (UDM) of a home public land mobile network (HPLMN) requests the VPLMN to retrieve SoR information in response to the registration type parameter indicating the mobility registration update when a SoR container has not been delivered to the UE in a previous registration; and in response to the SoR indicator for mobility registration, retrieve the SoR information from the UDM and delivering the SoR information to the UE in a registration accept message.

Example 41 includes the computer-readable storage medium of Example 40, wherein retrieving the SoR information from the UDM comprises invoke a Nudm_SDM_Get service operation message to the UDM to retrieve the SoR information.

Example 42 includes the computer-readable storage medium of Example 40, where deliver the SoR information to the UE comprises delivering the SoR container to the UE.

Example 43 includes the computer-readable storage medium of Example 40, wherein the SoR information comprises a prioritized list of preferred PLMNs or preferred PLMN and access technology combinations.

Example 44 includes the computer-readable storage medium of Example 43, wherein the SoR information further includes a list type indicator that indicates the prioritized list is one of a PLMN identifier (ID) and access technology list or a secured packet.

Example 45 is a computing apparatus comprising: a processor; and a memory storing instructions that, when executed by the processor, configure the apparatus to: configure a user equipment (UE) to operate according to a steering of roaming (SoR) configuration, wherein the SoR configuration comprises configuring the UE to determine whether SoR information is included in a registration accept message associated with a mobility registration in a visited public land mobile network (VPLMN); configure UE context information to include an SoR indicator for mobility registration indicating that the VPLMN is requested to retrieve the SoR information in response to a registration type parameter indicating a mobility registration update when a SoR container has not been delivered to the UE in a previous registration; and in response to a request from the VPLMN, provide the SoR information in the SoR container to the VPLMN to forward to the UE.

Example 46 includes the computing apparatus of Example 45, wherein the instructions further configure the apparatus to secure the SoR container using a key shared with the UE.

Example 47 includes the computing apparatus of Example 45, wherein the SoR configuration further comprises configure the UE to lower a priority of the VPLMN, if the UE determines that the SoR container is not in the registration accept message associated with a mobility registration in the VPLMN or that the SoR container failed an integrity check.

Example 48 includes the computing apparatus of Example 45, wherein the SoR information comprises a prioritized list of preferred PLMNs or preferred PLMN and access technology combinations.

Example 49 includes the computing apparatus of Example 45, wherein the SoR information further includes a list type indicator that indicates the prioritized list is one of a PLMN identifier (ID) and access technology list or a secured packet.

Example 50 is a non-transitory computer-readable storage medium, the computer-readable storage medium including instructions that when executed by a computer, cause the computer to: configure a user equipment (UE) to operate according to a steering of roaming (SoR) configuration, wherein the SoR configuration comprises configuring the UE to determine whether SoR information is included in a registration accept message associated with a mobility registration in a visited public land mobile network (VPLMN); configure UE context information to include an SoR indicator for mobility registration indicating that the VPLMN is requested to retrieve the SoR information in response to a registration type parameter indicating a mobility registration update when a SoR container has not been delivered to the UE in a previous registration; and in response to a request from the VPLMN, provide the SoR information in the SoR container to the VPLMN to forward to the UE.

Example 51 includes the computer-readable storage medium of Example 50, wherein the instructions further configure the computer to secure the SoR container using a key shared with the UE.

Example 52 includes the computer-readable storage medium of Example 50, wherein the SoR configuration further comprises configure the UE to lower a priority of the VPLMN, if the UE determines that the SoR container is not in the registration accept message associated with a mobility registration in the VPLMN or that the SoR container failed an integrity check.

Example 53 includes the computer-readable storage medium of Example 50, wherein the SoR information comprises a prioritized list of preferred PLMNs or preferred PLMN and access technology combinations.

Example 54 includes the computer-readable storage medium of Example 50, wherein the SoR information further includes a list type indicator that indicates the prioritized list is one of a PLMN identifier (ID) and access technology list or a secured packet.

Example 55 may include an apparatus comprising means to perform one or more elements of a method described in or related to any of the above Examples, or any other method or process described herein.

Example 56 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 57 may include an apparatus comprising logic, modules, or circuitry to perform one or more elements of a method described in or related to any of the above Examples, or any other method or process described herein.

Example 58 may include a method, technique, or process as described in or related to any of the above Examples, or portions or parts thereof Example 59 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 60 may include a signal as described in or related to any of the above Examples, or portions or parts thereof.

Example 61 may include a datagram, packet, frame, segment, protocol data unit (PDU), or message as described in or related to any of the above Examples, or portions or parts thereof, or otherwise described in the present disclosure.

Example 62 may include a signal encoded with data as described in or related to any of the above Examples, or portions or parts thereof, or otherwise described in the present disclosure.

Example 63 may include a signal encoded with a datagram, packet, frame, segment, PDU, or message as described in or related to any of the above Examples, or portions or parts thereof, or otherwise described in the present disclosure.

Example 64 may include an electromagnetic signal carrying computer-readable instructions, wherein execution of the computer-readable instructions by one or more processors is to cause the one or more processors to perform the method, techniques, or process as described in or related to any of the above Examples, or portions thereof Example 65 may include a computer program comprising instructions, wherein execution of the program by a processing element is to cause the processing element to carry out the method, techniques, or process as described in or related to any of the above Examples, or portions thereof.

Example 66 may include a signal in a wireless network as shown and described herein.

Example 67 may include a method of communicating in a wireless network as shown and described herein.

Example 68 may include a system for providing wireless communication as shown and described herein.

Example 69 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to communicate in a public land mobile network (PLMN), the method comprising:
generating, by the UE, a registration request message to send to a visited PLMN (VPLMN), the registration request message comprising a registration type parameter indicating a mobility registration update selected from among an initial registration, an emergency registration, and the mobility registration update;
processing, at the UE, a registration accept message from the VPLMN;
determining, by the UE, whether the registration accept message comprises valid steering of roaming (SoR) information from a home PLMN (HPLMN); and
in response to the UE being configured to receive the SoR information during the mobility registration update, rather than the initial registration or the emergency registration, and the UE not having received the SoR information during a current power cycle of the UE, selectively performing a PLMN selection procedure based on whether the registration accept message comprises the valid SoR information from the HPLMN;
wherein the SoR information further comprises a prioritized list of preferred PLMNs or preferred PLMN and access technology combinations; and
wherein selectively performing the PLMN selection procedure based on whether the registration accept message comprises the secure copy of the SoR information from the HPLMN comprises:
determining that the registration accept message does not include the SoR information or that the SoR information has been altered by the VPLMN;
setting the VPLMN as a lowest priority PLMN in a local list stored in the UE;
locally releasing a non-access stratum (NAS) signaling connection after sending a registration complete message to the VPLMN; and
performing the PLMN selection procedure based on the local list to attempt registration with a different PLMN.

2. The method of claim 1, wherein a subscriber identification module (SIM) or a universal SIM (USIM) of the UE is configured with an indication that the UE is to receive a SoR transparent container in the registration accept message, the SoR transparent container comprising the SoR information.

3. The method of claim 2, wherein determining whether the registration accept message comprises the secure copy of the SoR information from the HPLMN includes determining whether the SoR transparent container successfully passes an integrity check.

4. The method of claim 1, wherein the SOR information includes a list type indicator that indicates the prioritized list is a PLMN identifier (ID) and access technology list, and wherein the method further comprises replacing one or more highest priority entries in a local list stored in the UE with entries from the prioritized list.

5. The method of claim 1, wherein the SoR information includes a list type indicator that indicates the prioritized list comprises a secured packet received a short message service (SMS) message, and wherein the method further comprises:
processing the SMS message as if it is received with a protocol identifier set to subscriber identification module (SIM) data download, data coding scheme set to class 2 message, and SMS payload as secured packet contents of an SoR transparent container information element (IE); and
forwarding the SMS payload to a universal integrated circuit card (UICC).

6. A baseband processor for a user equipment (UE) to communicate in a public land mobile network (PLMN), the baseband processor configured to:
generate, by the baseband processor for the UE, a registration request message to send to a visited PLMN (VPLMN), the registration request message comprising a registration type parameter indicating a mobility registration update selected from among an initial registration, an emergency registration, and the mobility registration update;
process, by the baseband processor at the UE, a registration accept message from the VPLMN;
determining, by the UE, whether the registration accept message comprises valid steer of roaming (SoR) information from a home PLMN (HPLMN); and
in response to the UE being configured to receive the SoR information during the mobility registration update, rather than the initial registration or the emergency registration, and the UE not having received the SoR information during a current power cycle of the UE, selectively perform a PLMN selection procedure based on whether the registration accept message comprises the valid SoR information from the HPLMN;

wherein the SoR information further comprises a prioritized list of preferred PLMNs or preferred PLMN and access technology combinations; and wherein to selectively perform the PLMN selection procedure based on whether the registration accept message comprises the secure copy of the SoR information from the HPLMN includes to:
- determine that the registration accept message does not include the SoR information or that the SoR information has been altered by the VPLMN;
- set the VPLMN as a lowest priority PLMN in a local list stored in the UE;
- locally release a non-access stratum (NAS) signaling connection after sending a registration complete message to the VPLMN; and
- perform the PLMN selection procedure based on the local list to attempt registration with a different PLMN.

7. The baseband processor of claim 6, wherein a subscriber identification module (SIM) or a universal SIM (USIM) of the UE is configured with an indication that the UE is to receive a SoR transparent container in the registration accept message, the SoR transparent container comprising the SoR information.

8. The baseband processor of claim 7, wherein to determine whether the registration accept message comprises the secure copy of the SOR information from the HPLMN comprises to determine whether the SoR transparent container successfully passes an integrity check.

9. The baseband processor of claim 6, wherein the SoR information includes a list type indicator that indicates the prioritized list is a PLMN identifier (ID) and access technology list, and wherein the baseband processor of the UE is further configured to replace one or more highest priority entries in a local list stored in the UE with entries from the prioritized list.

10. The baseband processor of claim 6, wherein the SoR information includes a list type indicator that indicates the prioritized list comprises a secured packet received a short message service (SMS) message, and wherein the baseband processor is further configured to:
- process the SMS message as if it is received with a protocol identifier set to subscriber identification module (SIM) data download, data coding scheme set to class 2 message, and SMS payload as secured packet contents of an SoR transparent container information element (IE); and
- forward the SMS payload to a universal integrated circuit card (UICC).

11. A non-transitory computer-readable storage medium including instructions that, when executed by one or more processors of a user equipment (UE) for communication in a public land mobile network (PLMN), cause the UE to:
- generate, by the UE, a registration request message to send to a visited PLMN (VPLMN), the registration request message comprising a registration type parameter indicating a mobility registration update selected from among an initial registration, an emergency registration, and the mobility registration update;
- process, at the UE, a registration accept message from the VPLMN; determining, by the UE, whether the registration accept message comprises valid steer of roaming (SoR) information from a home PLMN (HPLMN); and
- in response to the UE being configured to receive the SoR information during the mobility registration update, rather than the initial registration or the emergency registration, and the UE not having received the SoR information during a current power cycle of the UE, selectively perform a PLMN selection procedure based on whether the registration accept message comprises the valid SoR information from the HPLMN;

wherein the SoR information further comprises a prioritized list of preferred PLMNs or preferred PLMN and access technology combinations; and wherein to selectively perform the PLMN selection procedure based on whether the registration accept message comprises the secure copy of the SoR information from the HPLMN comprises to:
- determine that the registration accept message does not include the SOR information or that the SoR information has been altered by the VPLMN;
- set the VPLMN as a lowest priority PLMN in a local list stored in the UE;
- locally release a non-access stratum (NAS) signaling connection after sending a registration complete message to the VPLMN; and
- perform the PLMN selection procedure based on the local list to attempt registration with a different PLMN.

12. The non-transitory computer-readable storage medium of claim 11, wherein a subscriber identification module (SIM) or a universal SIM (USIM) of the UE is configured with an indication that the UE is to receive a SoR transparent container in the registration accept message, the SoR transparent container comprising the SoR information.

13. The non-transitory computer-readable storage medium of claim 12, wherein to determine whether the registration accept message comprises the secure copy of the SoR information from the HPLMN comprises to determine whether the SoR transparent container successfully passes an integrity check.

14. The non-transitory computer-readable storage medium of claim 11, wherein the SoR information includes a list type indicator that indicates the prioritized list is a PLMN identifier (ID) and access technology list, and wherein the instructions, when executed by the one or more processors of the UE, further cause the UE to replace one or more highest priority entries in a local list stored in the UE with entries from the prioritized list.

* * * * *